(12) United States Patent
Wang et al.

(10) Patent No.: US 9,983,738 B2
(45) Date of Patent: May 29, 2018

(54) CONTACT DETECTION MODE SWITCHING IN A TOUCHSCREEN DEVICE

(71) Applicant: Parade Technologies, Ltd., Santa Clara, CA (US)

(72) Inventors: Han Wang, Shanghai (CN); Petro Ksondzyk, Seattle, WA (US); Leilei Chen, Shanghai (CN)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 435 days.

(21) Appl. No.: 14/513,189

(22) Filed: Oct. 13, 2014

(65) Prior Publication Data

US 2017/0322649 A1    Nov. 9, 2017

Related U.S. Application Data

(60) Provisional application No. 61/890,753, filed on Oct. 14, 2013, provisional application No. 61/890,738, filed on Oct. 14, 2013, provisional application No. 61/890,757, filed on Oct. 14, 2013, provisional application No. 62/004,724, filed on May 29, 2014, provisional application No. 62/028,393, filed on Jul. 24, 2014, provisional application No. 62/039,308, filed on Aug. 19, 2014, provisional application No. 62/039,796, filed on Aug. 20, 2014, provisional application No. 62/042,678, filed on Aug. 27, 2014, provisional application No. 61/890,745, filed on Oct.

(Continued)

(51) Int. Cl.
*G06F 3/044* (2006.01)
*G06F 3/041* (2006.01)

(52) U.S. Cl.
CPC .......... *G06F 3/044* (2013.01); *G06F 3/0418* (2013.01); *G06F 2203/04108* (2013.01); *G06F 2203/04112* (2013.01)

(58) Field of Classification Search
None
See application file for complete search history.

(56) References Cited

U.S. PATENT DOCUMENTS 8,115,753 B2    2/2012  Newton
8,519,970 B2    8/2013  Westhues et al.
(Continued)

OTHER PUBLICATIONS

Hills, Office Action, U.S. Appl. No. 14/513,179, dated Jan. 7, 2015, 8 pgs.

(Continued)

*Primary Examiner* — Kenneth Bukowski
(74) *Attorney, Agent, or Firm* — Morgan, Lewis & Bockius LLP

(57) ABSTRACT

A method is disclosed for determining detecting a conductive object and determining the type of object and the type of contact that object has with a touch sensitive surface, the method comprising measuring capacitance on a plurality of mutual capacitance sensors, each mutual capacitance sensor corresponding to a unit cell in an array of unit cells. After mutual capacitance is measured a peak unit cell is identified based on the measured capacitances and a matrix sum of a plurality of unit cells surround the peak unit cell is calculated. The value of the peak unit cell and the matrix sum are then compared to a range and a contact type determined based on the comparison.

19 Claims, 37 Drawing Sheets

Related U.S. Application Data 14, 2013, provisional application No. 61/890,794, filed on Oct. 14, 2013.

(56) References Cited

U.S. PATENT DOCUMENTS

| | | |
|---|---|---|
| 2009/0174675 A1 | 7/2009 | Gillespie et al. |
| 2009/0284495 A1 | 11/2009 | Geahan et al. |
| 2010/0060609 A1 | 3/2010 | Doi et al. |
| 2010/0141589 A1* | 6/2010 | Hoover ............... G06F 3/0425 345/173 |
| 2011/0007021 A1 | 1/2011 | Berstein et al. |
| 2012/0062498 A1* | 3/2012 | Weaver ............ G06F 3/03545 345/174 |
| 2012/0139870 A1 | 6/2012 | Beyly et al. |
| 2012/0182225 A1 | 7/2012 | Brosnan |
| 2013/0002579 A1 | 1/2013 | Hatano |
| 2013/0069886 A1 | 3/2013 | Wang |
| 2013/0155015 A1* | 6/2013 | Chang .................. G06F 3/044 345/174 |
| 2013/0201151 A1 | 8/2013 | Takashima et al. |
| 2013/0244731 A1 | 9/2013 | Oishi et al. |
| 2013/0328828 A1* | 12/2013 | Tate ..................... G06F 3/044 345/174 |
| 2014/0028605 A1* | 1/2014 | Luo ..................... G06F 3/044 345/174 |
| 2016/0098148 A1 | 4/2016 | Gandra et al. |

OTHER PUBLICATIONS

Hills, Notice of Allowance, U.S. Appl. No. 14/513,179, dated Aug. 11, 2015, 8 pgs.

Hills, Office Action, U.S. Appl. No. 14/970,473, dated Jan. 26, 2016, 5 pgs.

Hills, Final Office Action, U.S. Appl. No. 14/970,473, dated Jun. 3, 2016, 13 pgs.

Hills, Office Action, U.S. Appl. No. 14/970,473, dated Nov. 3, 2016, 13 pgs.

Hills, Notice of Allowance, U.S. Appl. No. 14/970,473, dated Feb. 27, 2017, 8 pgs.

Parade Technologies, Ltd., International Search Report and Written Opinion, PCT/US2014/060456, dated Jan. 21, 2015, 9 pgs.

Parade Technologies, Ltd., International Preliminary Report on Patentability, PCT/US2014/060456, dated Apr. 19, 2016, 7 pgs.

* cited by examiner

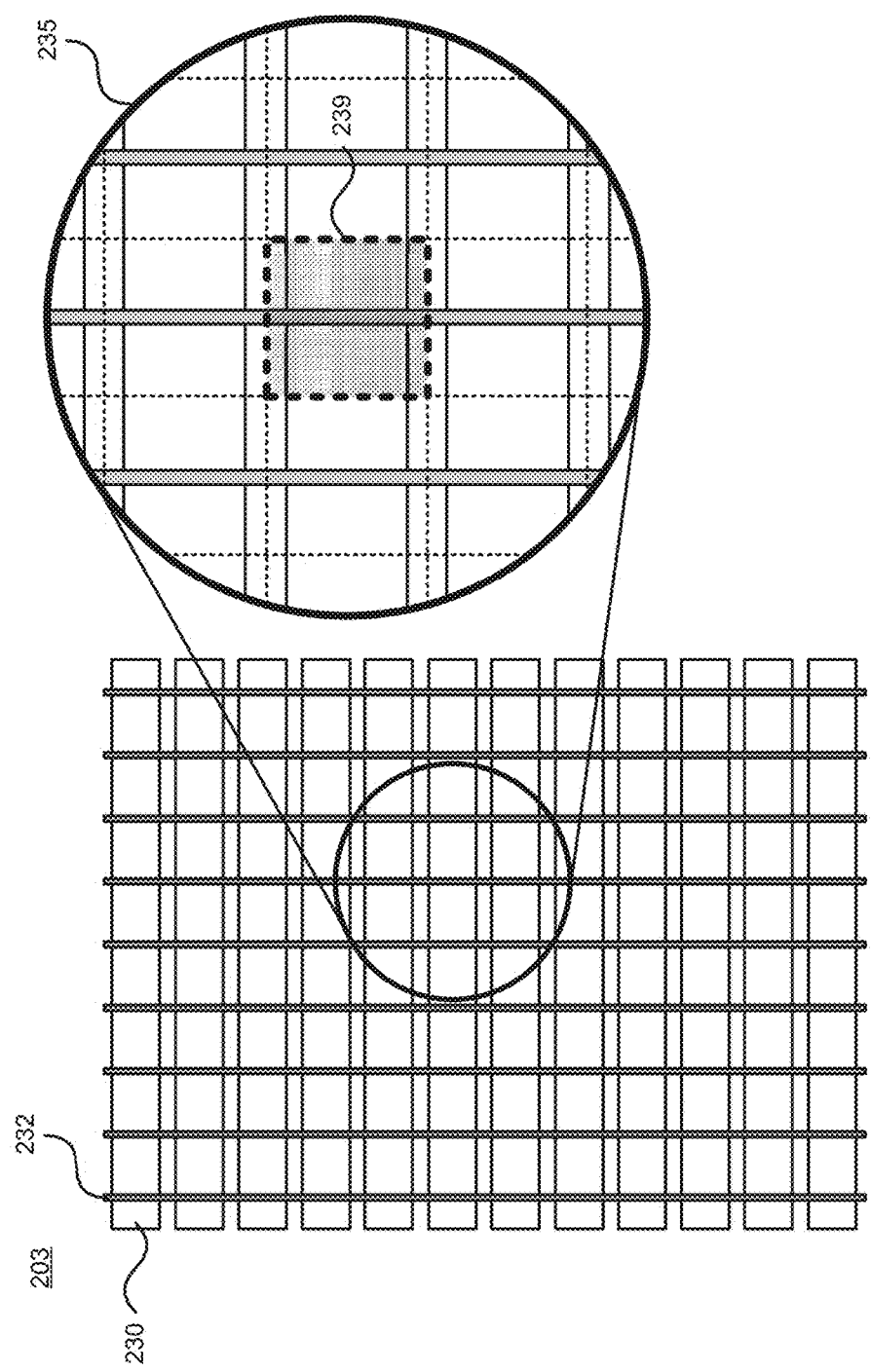

| | A | B | C | D | E | F | G | H |
|---|---|---|---|---|---|---|---|---|
| 1 | | | | | | | | |
| 2 | | | | | | | | |
| 3 | | | 172 | 220 | 231 | 226 | | |
| 4 | | | 236 | 294 | 306 | 298 | | |
| 5 | | | 262 | 327 | 348 | 339 | | |
| 6 | | | 274 | 340 | 362 | 347 | | |
| 7 | | | 224 | 283 | 306 | 298 | | |
| 8 | | | 183 | 226 | 245 | | 1041 | |
| 9 | | | 132 | 162 | 178 | 178 | | |
| 10 | | | 86 | 106 | 112 | 119 | | |
| 11 | | | | | | | | |
| 12 | | | | | | | | |

FIGURE 10C

| | A | B | C | D | E | F | G | H |
|---|---|---|---|---|---|---|---|---|
| 1 | -2 | 1 | 3 | 2 | 0 | 2 | 0 | 1 |
| 2 | 2 | 6 | 4 | 8 | 7 | 6 | 2 | 5 |
| 3 | 5 | 5 | 6 | 13 | 15 | 10 | 10 | 5 |
| 4 | 12 | 16 | 16 | 21 | 24 | 20 | 16 | 9 |
| 5 | 4 | 15 | 14 | 21 | 23 | 16 | 10 | 11 |
| 6 | 11 | 16 | 18 | 23 | 23 | 18 | 11 | 11 |
| 7 | 9 | 9 (1033) | 12 | 16 | 21 | 14 | 9 | 14 |
| 8 | 3 | 2 | 13 | 15 | 16 | 7 | 11 (1031) | 7 |
| 9 | 2 | 5 | 4 | 6 | 8 | 2 | 11 | 5 |
| 10 | 3 | 3 | 2 | 4 | 5 | 2 | 2 | 1 |
| 11 | 3 | 1 | 5 | 6 | 2 | 2 | 3 | 2 |
| 12 | 0 | 1 | -2 | 1 | 2 | 0 | 2 | 1 |

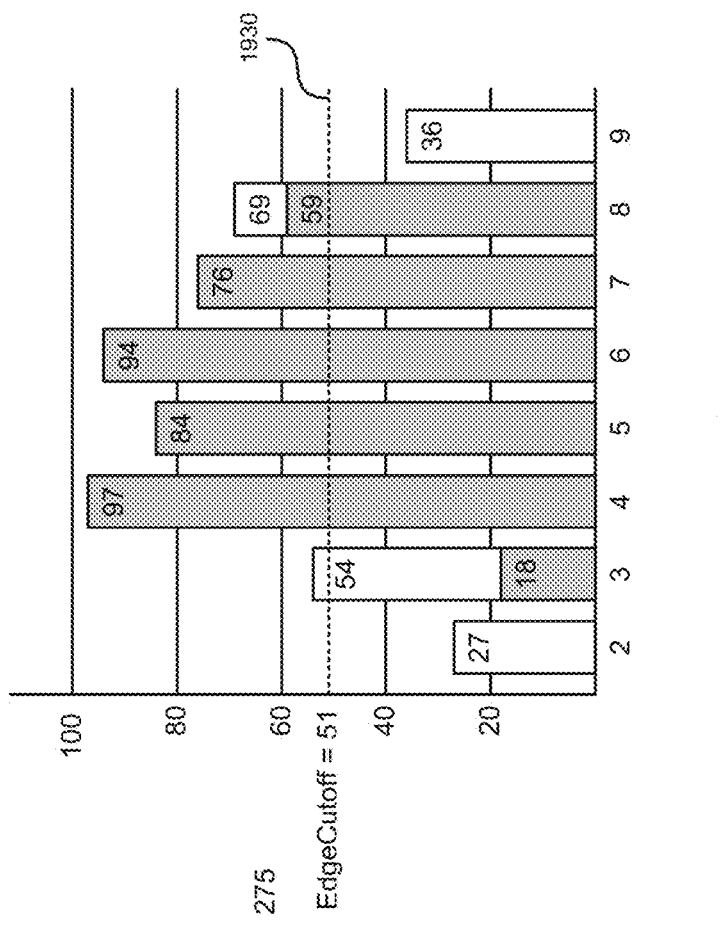
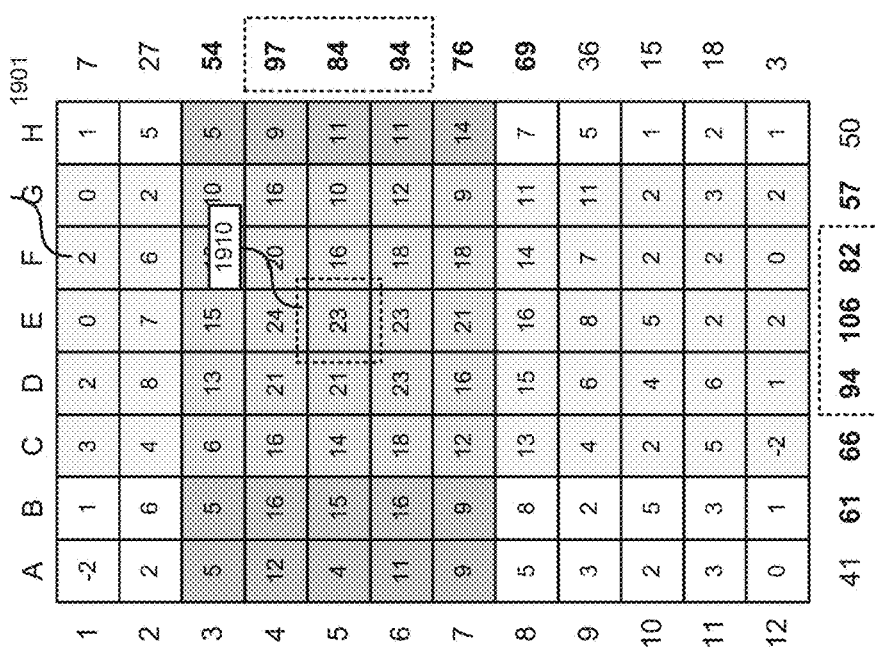
FIGURE 19B
FIGURE 19A

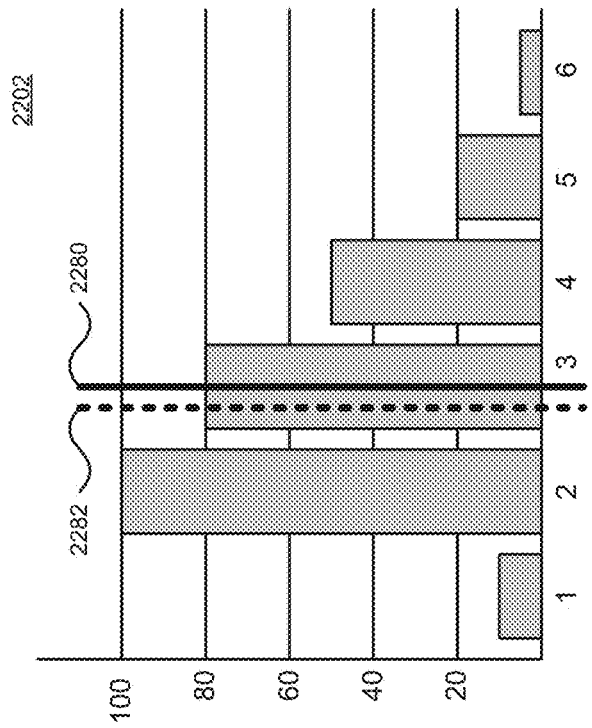
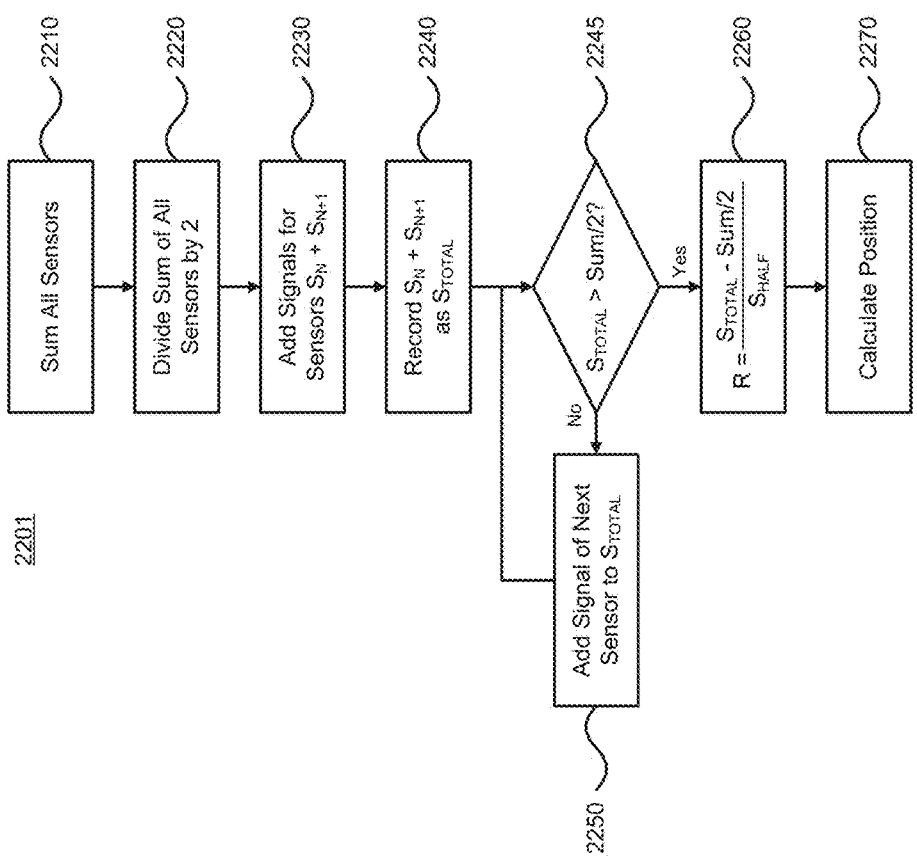
FIGURE 22B
FIGURE 22A

FIGURE 23C

| | | | | | | | |
|---|---|---|---|---|---|---|---|
| 1 | 2 | 7 | 12 | 12 | 12 | 7 | 9 | 3 |
| 4 | 10 | 13 | 16 | 8 | 23 | 18 | 9 | 7 |
| 5 | 11 | 21 | 17 | 28 | 31 | 14 | 9 | 5 |
| 6 | 9 | 18 | 22 | 28 | 35 | 21 | 14 | 6 |

Hover near Edge — Ratio = 1.1

FIGURE 23B

| 1 | 4 | 3 | 4 | 3 | 6 | 3 | 6 | 0 |
| -1 | 1 | 9 | 13 | 9 | 9 | 2 | 4 | 0 |
| 2 | 3 | 9 | 14 | 19 | 9 | 3 | 1 | 3 |
| 2 | 3 | 13 | 21 | 14 | 14 | 6 | 4 | 0 |

Hover over Edge — Ratio = 1.5

FIGURE 23A

| 2 | 0 | 0 | 5 | 0 | 4 | 3 | 4 | 1 |
| 2 | 1 | 1 | 9 | 8 | 8 | 4 | 2 | 1 |
| 3 | 9 | 3 | 19 | 21 | 12 | 1 | 4 | 1 |
| 3 | 9 | 22 | 76 | 95 | 34 | 4 | 7 | 1 |

Grip — Ratio = 3.7

CONTACT DETECTION MODE SWITCHING IN A TOUCHSCREEN DEVICE

RELATED APPLICATION

This patent application claims the benefit of U.S. Provisional Patent Application No. 61/890,738, filed Oct. 14, 2013, U.S. Provisional Patent Application No. 61/890,745, filed Oct. 14, 2013, U.S. Provisional Patent Application No. 61/890,753, filed Oct. 14, 2013, U.S. Provisional Patent Application No. 61/890,757, filed Oct. 14, 2013, U.S. Provisional Patent Application No. 61/890,794, filed Oct. 14, 2013, U.S. Provisional Patent Application No. 62/004,724, filed May 29, 2014, U.S. Provisional Patent Application No. 62/028,393 filed Jul. 24, 2014, U.S. Provisional Patent Application 62/039,308, filed Aug. 19, 2014, U.S. Provisional Patent Application No. 62/039,796, filed Aug. 20, 2014, and U.S. Provisional Patent Application 62/042,678, filed Aug. 27, 2014, each of which is incorporated by reference herein in its entirety.

TECHNICAL FIELD

This disclosure relates generally to electronic systems, and, more particularly, touchscreen interfaces and operation.

BACKGROUND

Capacitance sensing systems can sense electrical signals generated on electrodes that reflect changes in capacitance. Such changes in capacitance can indicate a touch event (e.g., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern consumer applications, providing user interface options in existing products. Capacitive sense elements can range from a single button to a large number of sensors arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element, and looking for a change in capacitance indicating a touch or presence of a conductive object. When a conductive object (e.g., a finger, hand, or other object) comes into contact or proximity with a capacitive sense element or surface above a capacitive sense element, the capacitance changes and the conductive object is detected. The capacitance changes of the capacitive touch sense elements can be measured by an electrical circuit. The electrical circuit converts the capacitances of the capacitive sense elements into digital values.

SUMMARY

A method is disclosed for determining detecting a conductive object and determining the type of object and the type of contact that object has with a touch sensitive surface, the method comprising measuring capacitance on a plurality of mutual capacitance sensors, each mutual capacitance sensor corresponding to a unit cell in an array of unit cells. After mutual capacitance is measured a peak unit cell is identified based on the measured capacitances and a matrix sum of a plurality of unit cells surround the peak unit cell is calculated. The value of the peak unit cell and the matrix sum are then compared to a range and a contact type determined based on the comparison.

A user interface device is disclosed that comprises a first plurality capacitance sensing electrodes disposed along a first axis of an array, a second plurality of capacitance sensing electrodes disposed along a second axis of an array, and a controller. The controller may be configured to measure capacitance on a plurality of mutual capacitance sensors, each mutual capacitance sensor corresponding to a unit cell in the array of unit cells. After the controller measures identifies the peak unit cell based on the measured capacitances, it may calculate a matrix sum of a plurality of unit cells surround the peak unit cell. The value of the peak unit cell and the matrix sum are then compared to a range and a contact type determined based on the comparison.

A touchscreen controller is disclosed that may be configured to measure capacitance on a plurality of mutual capacitance sensors, each mutual capacitance sensor corresponding to a unit cell in the array of unit cells. After the controller measures identifies the peak unit cell based on the measured capacitances, it may calculate a matrix sum of a plurality of unit cells surround the peak unit cell. The value of the peak unit cell and the matrix sum are then compared to a range and a contact type determined based on the comparison

DESCRIPTION OF THE DRAWINGS

FIG. 2B illustrates an array of bar-shaped electrodes arranged in a two dimensional array, according to one embodiment.

FIG. 6A illustrates measured changes in capacitance numerically on a capacitance sensing array, according to one embodiment.

FIG. 6B illustrates measured changes in capacitance graphically on a capacitance sensing array, according to one embodiment.

FIG. 6C illustrates a plurality of detected peaks on a capacitance sensing array, according to one embodiment.

FIG. 10A illustrates an array of unit cells with mutual capacitance difference values according to one embodiment.

FIG. 10B illustrates an array of unit cells with mutual capacitance difference values, wherein each value is updated with a 3×3 sum of all values about a center value, according to one embodiment.

FIG. 10C illustrates an array of mutual capacitance difference values with a first peak unit cell, according to one embodiment.

FIG. 10D an array of mutual capacitance difference values, wherein each value is updated with a 5×5 sum of all values about a center value and an updated peak unit cell, according to one embodiment.

FIG. 19A illustrates a table of data used for determining which unit cells to include in hover position calculation, according to one embodiment.

FIG. 19B illustrates an application of an EdgeCutoff from FIG. 19A, according to one embodiment.

FIG. 22A illustrates a method for calculating a position of a hover contact over an array, according to one embodiment.

FIG. 22B illustrates an example of calculation of a position of a hover contact over an array, according to one embodiment.

FIG. 23A illustrates calculation of a ratio representative of a grip, according to one embodiment.

FIG. 23B illustrates calculation of a ratio representative of a hover over the edge of an array, according to one embodiment.

FIG. 23C illustrates calculation of a ratio representative of a hover near the edge of an array, according to one embodiment.

DETAILED DESCRIPTION

Figure 1A:
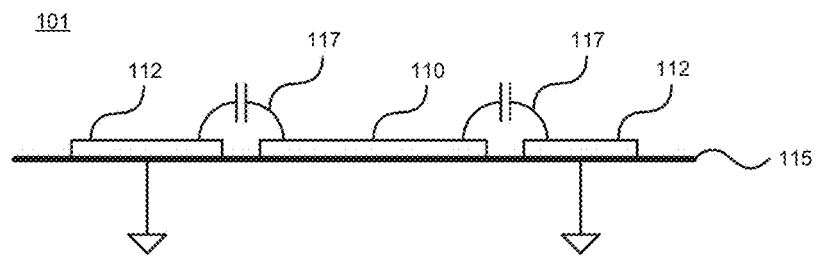
FIG. 1A illustrates a representation of self capacitance, according to one embodiment.

In the following description, for purposes of explanation, numerous specific details are set forth in order to provide a thorough understanding of the embodiments of the present invention discussed herein. It will be evident, however, to one skilled in the art that these and other embodiments may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

For simplicity and clarity of illustration, reference numerals may be repeated among the figures to indicate corresponding or analogous elements. Numerous details are set forth to provide an understanding of the embodiments described herein. The examples may be practiced without these details. In other instances, well-known methods, procedures, processes, and components are not described in detail to avoid obscuring the examples described. The description is not to be considered as limited to the scope of the examples described herein.

Capacitance

A capacitor is formed by two conductive plates that are separated by a space filled with a dielectric material. The capacitance of a capacitor made of two large plates (in farads), C, is given by:

$$C = \varepsilon_r \varepsilon_0 \frac{A}{d}, \quad (1)$$

where A is the area of overlap between the two conductive plates (m$^2$), d is the distance between the two conductive plates (m), $\varepsilon_r$ is the dielectric constant of the material between the two conductive plates, and $\varepsilon_0$ is the electric constant ($\varepsilon_0 \approx 8.854 \times 10^{-12}$ F·m$^{-1}$). In addition, fringe capacitances along the edges of two adjacent conductive plates adds to the total capacitance therebetween.

In one embodiment, the conductive plates may be conventional metal plates (such as copper electrodes). In another embodiment, the conductive plates may be formed from a transparent conductive material (such as indium tin oxide, "ITO"), silver or carbon ink, or metal mesh. In still another embodiment, a conductive plate may be a human finger or palm. Any material that is capable of conducting electricity may serve as a conductive plate of a capacitor.

A capacitor can store a charge transferable to other portions of a circuit. The charge stored by a capacitor (in coulombs), q, is given by:

$$q = CV, \quad (2)$$

where C is the capacitance of the capacitor given in equation (1) as well as the fringe capacitance and V is the voltage differential between the two conductive plates.

A capacitance may be measured as a self capacitance, the capacitance of a single conductive plate (electrode) to its surroundings which serve as the second conductive plate, or as mutual capacitance, the capacitance between two specific conductive plates. Self and mutual capacitances may be changed by the presence of additional conductive plates, such as a finger, in proximity to the conductive plates under test. For the purposes of this description, conductive plates are referred to as "electrodes" or "sensors." This is not intended to be limiting as circuits may describe the conductive plates of a capacitor in different terms. Additionally, while a finger is a conductive plate for the purposes of creating a capacitor, it may not be referred to as an "electrode" or "sensor." While fingers are used in the following description to be representative of the conductive object that is sensed by the capacitance sensor and measurement circuit, other conductive objects may be used.

Sensor Construction

Figure 7A:
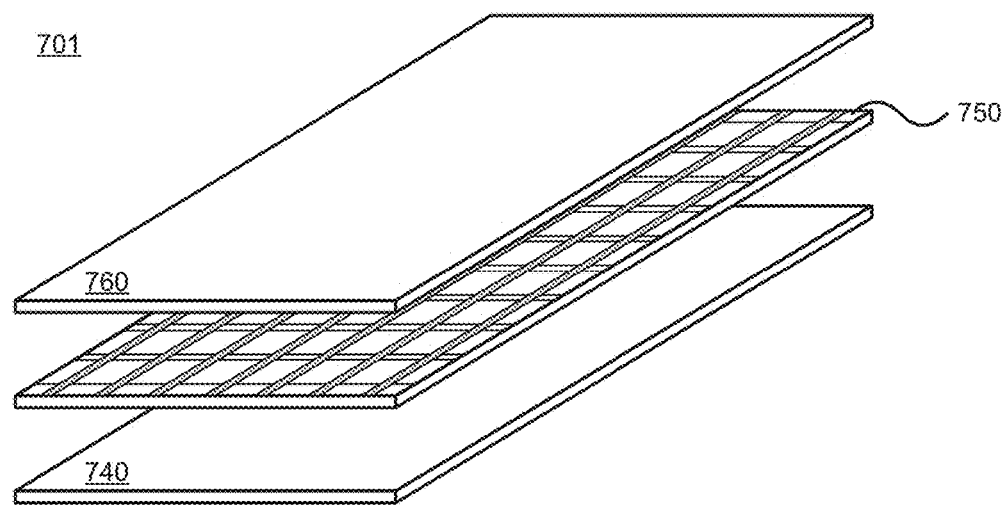
FIG. 7A illustrates a stack-up of a touchscreen, according to one embodiment.
Figure 7B:
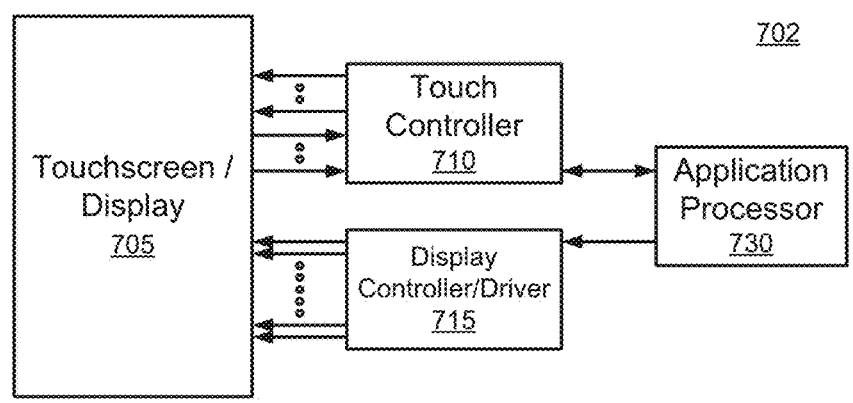
FIG. 7B illustrates a touchscreen system, according to one embodiment.

FIG. 1A illustrates a representation of self capacitance in a system 101 according to one embodiment. An electrode 110 may be disposed on a substrate 115. A capacitance 117 may exist between electrode 110 and at least one other electrode 112 according to Equation (1). In one embodiment, electrodes 110 and 112 may be formed from copper. In another embodiment, electrodes 110 and 112 may be formed from a transparent conductive material such as indium tin oxide (ITO). In still another embodiment, electrodes 110 and 112 may be formed from silver or carbon ink, metal mesh, or another conductive material. Substrate 115 may be glass in one embodiment. In other embodiments, substrate 115 may be a plastic film (such as polyethylene terephthalate, "PET", or some other polycarbonate), a flexible printed circuit board material, or a rigid printed circuit board material (such as FR4). Substrate 115 may be a separate layer or it may be part of a larger, integrated system as shown in FIGS. 7A and 7B below. While capacitance 117 is shown to be between electrode 110 and electrodes 112, which are coupled to a ground voltage potential, one of ordinary skill in the art would understand that the capacitances between electrodes 110 and 112 may exist at any voltage potential and that a ground connection is not required. Additionally, although only capacitive coupling between electrode 110 and electrode 112 is shown, electrode 110 may capacitively couple to circuit elements not shown in FIG. 1A.

Figure 1B:
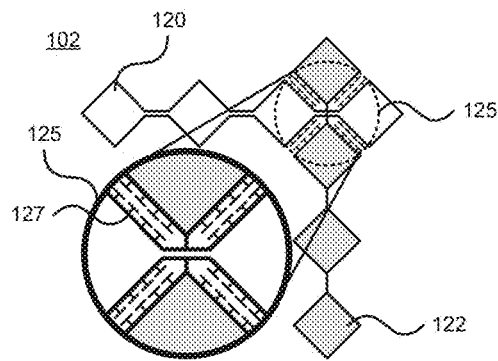
FIG. 1B illustrates a representation of mutual capacitance between a row and a column electrode comprised of diamond-shaped sense elements, according to one embodiment.

FIG. 1B illustrates a representation of mutual capacitance in a system 102 according to one embodiment. A first electrode 120 including multiple diamond-shaped elements may be disposed on a substrate (not shown) along a first axis. A second electrode 122 including multiple diamond-shaped elements may be disposed along a second axis. In one embodiment, there may be a mutual capacitance 127 at the intersection 125 of the electrodes 120 and 122.

In various embodiments, electrodes 120 and 122 may be formed from copper, a transparent conductive material such as ITO, silver or carbon ink, metal mesh, or other conductive materials or combinations of conductive materials. The substrate (e.g., see substrate 115 of FIG. 1A), in various embodiments, may be glass, plastic film (such as polyethylene terephthalate, "PET", or some other polycarbonate), a flexible printed circuit board material, or a rigid printed circuit board material (such as FR4). Additionally, among embodiments, the substrate may be a separate layer or it may be part of a larger, integrated system as shown in FIGS. 7A and 7B below, for example. In one embodiment, electrodes 120 and 122 may be disposed on two different substrates that are adhered together. In other embodiments, electrodes 120 and 122 may be disposed on two sides of the same substrate or may be disposed on the same side of a substrate and the connections for either electrode 120 or electrode 122 formed by a jumper between individual elements of electrodes 120 and 122 and disposed over a dielectric material.

Figure 1C:
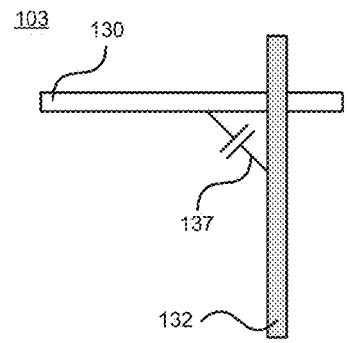
FIG. 1C illustrates a representation of mutual capacitance between a row and a column of bar-shaped electrodes, according to one embodiment.

FIG. 1C illustrates another representation of mutual capacitance in a system 103 according to another embodiment. A first electrode 130 may be disposed on a substrate (e.g., see substrate 115 of FIG. 1A) along a first axis. A second electrode 132 may be disposed along a second axis. Electrodes 130 and 132 may be bar-shaped in one embodiment. In another embodiment, electrodes 130 and 132 may have more complex structures that are based on the bar-shaped theme. At the intersection of electrodes 130 and 132 there may exist a mutual capacitance 137. In one embodiment, electrodes 130 and 132 may be formed from copper. In another embodiment, electrodes 130 and 132 may be formed from a transparent conductive material such as ITO. In still another embodiment, electrodes 110 and 112 may be formed from silver or carbon ink, metal mesh, or another conductive material.

Mutual capacitances 127 and 137 may be used to detect the location of one or more conductive objects on or near a surface (e.g. FIGS. 6A through 6E). An array of mutual capacitances (see description of FIGS. 2A and 2B below) may be used to detect one or more conductive objects on an edge of a device with a touch surface. In one embodiment, the edge on which the conductive object is placed may be a surface perpendicular to the substrate on which the electrodes are disposed, as shown in FIG. 7A.

In various embodiments, electrodes 130 and 132 may be formed from copper, a transparent conductive material such as indium tin oxide (ITO), silver or carbon ink, metal mesh, or other conductive materials or combinations of conductive materials. The substrate (e.g., see substrate 115 of FIG. 1A), in various embodiments, may be glass, plastic film (such as PET or some other polycarbonate), a flexible printed circuit board material, or a rigid printed circuit board material (such as FR4). Additionally, among embodiments, the substrate may be a separate layer or it may be part of a larger, integrated system as shown in FIGS. 7A and 7B below, for example. In one embodiment, electrodes 130 and 132 may be disposed on two different substrates that are adhered together. In other embodiments, electrodes 130 and 132 may be disposed on two sides of the same substrate or may be disposed on the same side of a substrate and the connections for either electrode 130 or electrode 132 formed by a jumper between individual elements of electrodes 130 and 132 and disposed over a dielectric material.

Figure 2A:
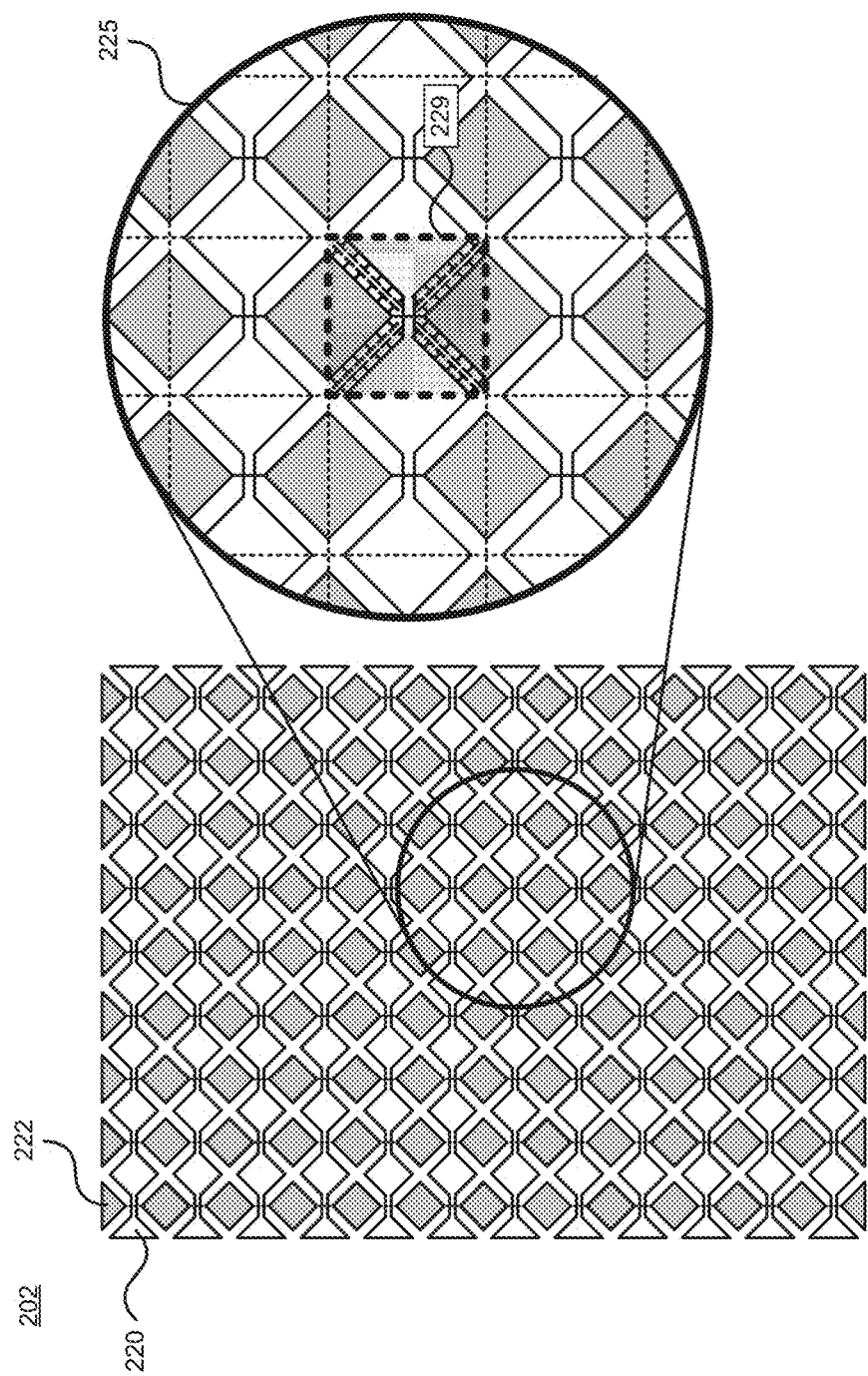
FIG. 2A illustrates an array of diamond-shaped sense elements arranged in a two-dimensional array, according to one embodiment.

FIG. 2A illustrates an array of electrodes 202 similar to those shown in FIG. 1B. A first plurality of electrodes 220 including multiple diamond-shaped elements may disposed on a substrate (not shown) along a first axis. A second plurality of electrodes 222 including multiple diamond-shaped elements may disposed on a substrate along a second axis. Close-up 225 illustrates the intersection between the first plurality of electrodes 220 and the second plurality of electrodes 222. There may be a mutual capacitance at the intersection an electrode from the first plurality of electrodes 220 and an electrode of the second plurality of electrodes 222 (e.g., like mutual capacitance 127 of FIG. 1B). This region of mutual capacitance may be described as a unit cell 229 of the array of electrodes 202. Unit cells exist at every intersection and may be used to detect the location of a conductive object or to detect the presence of at least one conductive object along an edge of a touchscreen-enabled device as shown in FIG. 7A.

FIG. 2B illustrates an array of electrodes 203 similar to those shown in FIG. 1C. A first plurality of electrodes 230 may be disposed on a substrate (not shown) along a first axis. A second plurality of electrodes 232 may be disposed on a substrate along a second axis. Electrodes 230 and 232 may be bar-shaped in one embodiment. In another embodiment, electrodes 230 and 232 may have more complex structures that are based on the bar-shaped theme. Close-up 235 illustrates the intersection between the first plurality of electrodes 230 and the second plurality of electrodes 232. Similar to FIG. 2A there may be a mutual capacitance at the intersection an electrode from the first plurality of electrodes 230 and an electrode of the second plurality of electrodes 232 and this region of mutual capacitance may be described as a unit cell 239 of the array of electrodes 203. Unit cells exist at every intersection and may be used to detect the location of a conductive object or to detect the presence of at least one conductive object along an edge of a touchscreen-enabled device as shown in FIG. 7A.

Unit cells 229 and 239 and their measured capacitance values may be used to detect the location of one or more conductive objects on or near a surface (e.g. FIGS. 6A through 6E). An array of unit cells may be used to detect one or more conductive objects of various types, including bare fingers, gloved fingers, styli (either active or passive) or an object hover above the surface. Unit cells may be used individually, in combination, or both to determine object and interaction type.

Unit cells 229 and 239 may be conceptualized geometrically as the smallest unit of tessellation. That is, the smallest repeatable unit of measurement on the array. Unit cells 229 and 239 may also be conceptualized by stating that every point within the unit cell is closer to the center of that unit cell (the center of the intersection between the electrodes on different axes) than it is to the center of any other unit cell. Unit cells 229 and 239 may be conceptualized functionally as the native resolution of the arrays 202 and 203. That is, each row and column may be identified and a position defined on each row and column. For a rectangular array with twelve columns and nine rows, there may be 108 discrete locations. Since unit cell 229 exists between the seventh row (from the top) and the sixth column (from the left) and unit cell 239 exists at the intersection between the sixth row and the sixth column, their positions may be given by 6,7 and 6,6, respectively, based on the native resolution of arrays 202 and 203. Unit cells 229 and 239 may be conceptualized as pixels of an array, wherein each pixel may be assigned a location and a measurable value specific to that location. An example of a pixel-based interpretation of unit cells is given in FIGS. 6A and 6B below. Unit cells 229 and 239 may also be referred to as "nodes" wherein each intersection of the row and column electrodes is a node of the array. Unit cells may be referred merely as intersections in a mutual capacitance sensing array, as shown in FIGS. 2B and 2C. The term "intersection" is merely shorthand for their construction as an intersection between row and column electrodes.

Capacitance Sensing

Figure 3A:
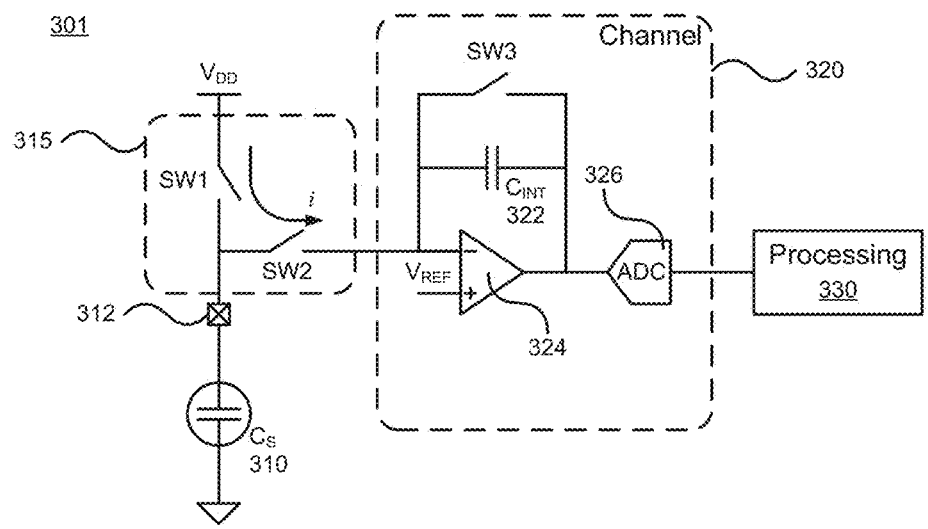
FIG. 3A illustrates as sensing circuit for self capacitance measurement, according to one embodiment.

FIG. 3A illustrates one embodiment of a self capacitance measurement circuit 301. Self capacitance sensor 310 ($C_S$) may be formed between an electrode 110 as shown in FIG. 1A and ground. The non-grounded side of self capacitance sensor 310 may be coupled to a pin 312 of capacitance measurement circuit 301. A switch network 315 may be used to generate a current by alternately charging self capacitance sensor 310 to a voltage ($V_{DD}$) and discharging the accumulated charge onto an integration capacitor 322, which may be part of channel 320. The current from switch network 315 and self capacitance sensor 310 may be given by:

$$I = \frac{V}{R_{eq}}, \quad (3)$$

where the equivalent resistance of the switch network 315 and self capacitance sensor 310 is given by:

$$R_{eq} = \frac{1}{fC_S} \quad (4)$$

where $C_S$ is given by equation (1) and f is the switching frequency of switches SW1 and SW2. Switch network 315 and integration capacitor 322 may be coupled to an input of operational amplifier 324 with a reference voltage ($V_{REF}$) to allow step-wise linear charging of integration capacitor 322. The voltage across integration capacitor 322 may be measured by analog-to-digital converter (ADC) 326, the output of which may be analyzed by processing block 330. After the voltage across integration capacitor 322 by ADC 326, the voltage across integration capacitor 322 may be reset by switch SW3, allowing a new measurement.

Figure 3B:
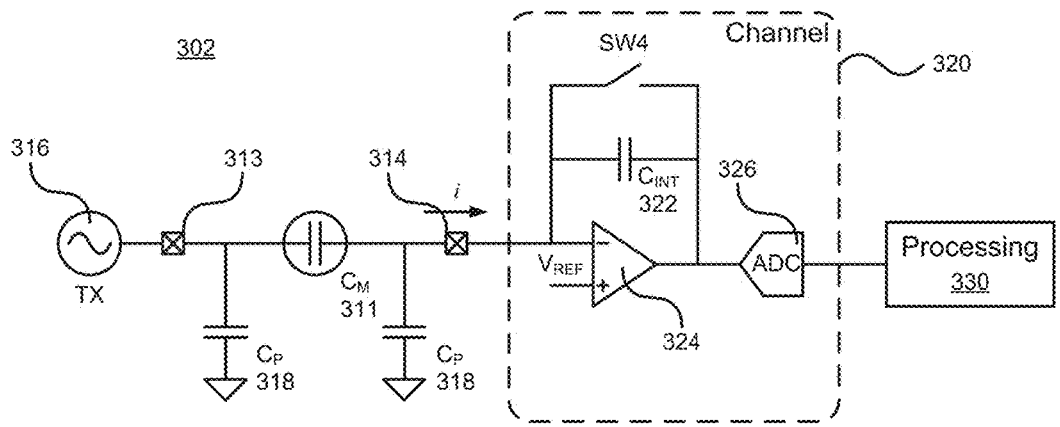
FIG. 3B illustrates as sensing circuit for mutual capacitance measurement, according to one embodiment.

FIG. 3B illustrates one embodiment of a mutual capacitance measurement circuit 302. Mutual capacitance sensor 311 ($C_M$) may be formed at the intersection of two electrodes (120 and 122 of FIG. 1B; 130 and 132 of FIG. 1C), which also have a parasitic capacitance 318 ($C_P$). Each plate of mutual capacitance sensor 311 may be coupled to a pin of mutual capacitance sensing circuit 302. A first pin 313 may be coupled to a signal generator (TX) 316 and a second pin 314 may be coupled to channel 320. The alternating voltage of signal generator 316 may produce a current from mutual capacitance sensor 311 to an integrating capacitor 322 of channel 320. In one embodiment, the voltage across integration capacitor 322 may be measured by ADC 326, the output of which may be analyzed by processing block 330. After the voltage across integration capacitor 322 by ADC 326, the voltage across integration capacitor 322 may be reset by switch SW4, allowing a new measurement. In another embodiment, the current from mutual capacitance sensor 311 may be used to bias an input of a self capacitance measurement circuit 301 similar to that shown in FIG. 3A. The bias provided by the mutual capacitance induced current may provide greater dynamic range of the combination of the integration capacitor 322 and ADC 326.

While channel 320 of FIGS. 3A and 3B are shown to comprise an operational amplifier (324) and an ADC (326), one of ordinary skill in the art would understand that there are many ways to measure a voltage on an integration circuit and that the embodiments of FIGS. 3A and 3B are intended as exemplary and not limiting. For example, ADC 326 may be replaced by a comparator and a counting mechanism gated by the output of the comparator to produce a digital representation of the capacitance on the integrating circuit. In this embodiment, the number of counts from the counting mechanism may represent the time required to charge the integrating circuit to a reference voltage of the comparator. Larger charging currents may produce faster charging of the integrating circuit and lower count values.

Capacitance measurement circuits such as those in shown in FIGS. 3A and 3B may implemented on an integrated circuit (IC) alone or with several instances of each to measure the capacitances of a plurality of inputs.

Figure 4A:
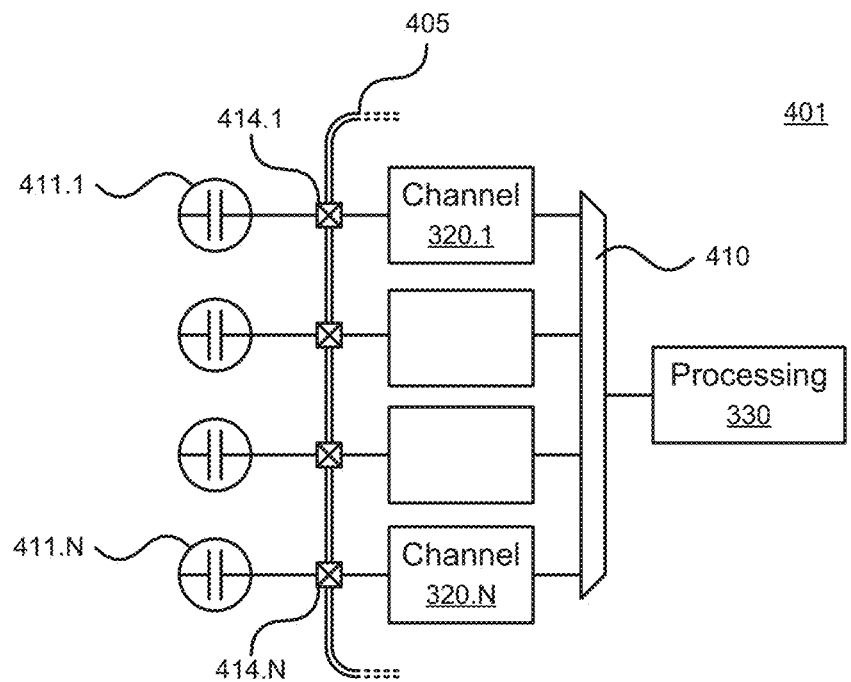
FIG. 4A illustrates connections between a plurality of sensing channels and a plurality of measurable capacitances, according to one embodiment.

FIG. 4A illustrates a circuit 401 for measuring multiple capacitances 411.1 through 411.N according to one embodiment. In circuit 401, four capacitances 411.1 through 411.N may be coupled to pins 414.1 through 414.N of sensing IC 405. Each mutual capacitance 411.1 through 411.N may be coupled to channels 320.1 through 320.N and the outputs of each of channels 320.1 through 320.N coupled to a processing block 330 through multiplexor 410.

Figure 4B:
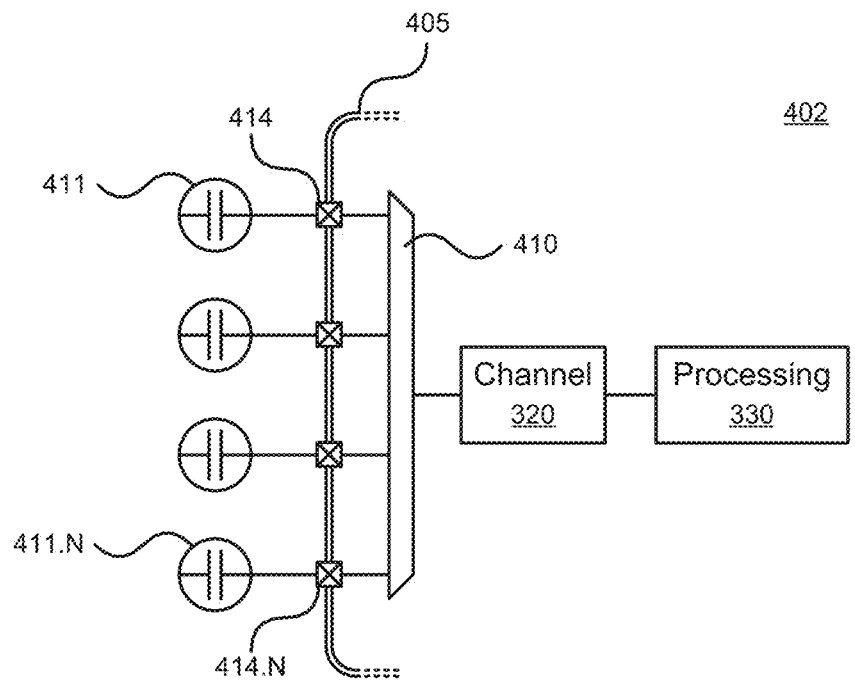
FIG. 4B illustrates connections between a single sensing channel and a plurality of measurable capacitances, according to one embodiment.

FIG. 4B illustrates a circuit 402 for measuring multiple capacitances 411.1 through 411.N according to another embodiment. In circuit 402, four capacitances 411.1 through 411.N may be coupled to pins 414.1 through 414.N of sensing IC 405. Each capacitance 411.1 through 411.N may be coupled to an input of multiplexor 410, the output of which may be coupled to channel 320. The output of channel 320 may be coupled to processing block 330.

FIGS. 4A and 4B illustrate the logical extremes of individual channels for each capacitance or a single channel for all capacitances. However, in another embodiment, different combinations of the circuits of FIGS. 4A and 4B may be implemented. For example, multiple channels 320 may be coupled to multiple capacitances 411. In one embodiment, the capacitances may be distributed evenly across all the available channels. In another embodiment, the capacitances may be distributed unevenly, with certain channels configured to measure capacitance on more pins than other channels. Additionally, while FIGS. 4A and 4B illustrate four capacitances, pins, or channels, one of ordinary skill in the art would understand that more or less than four of each may be used. Additionally, the number of capacitances, pins, and channels may be the same or they may be different, depending on the design requirements.

Capacitances 411.1 through 411.N may be coupled to signals opposite to pins 414.1 through 414.N to produce a current input to channel 320 representative of a measured capacitance as described in FIG. 3. In another embodiment, capacitances 411.1 through 411.N may be coupled to signals to produce a current used for calibration of circuits 401 and 402.

While FIGS. 4A and 4B illustrate a multiplexor, one of ordinary skill in the art would recognize that a plurality of switches may be configured to perform similar functionality as a multiplexor. The representation of the mechanism by which capacitances 411.1 through 411.N are coupled to channel 320 or how channels 320.1 through 320.N are coupled to processing block 330 by a multiplexor is merely exemplary and not intended to limit the description to a specific circuit element.

Processing

Figure 5:
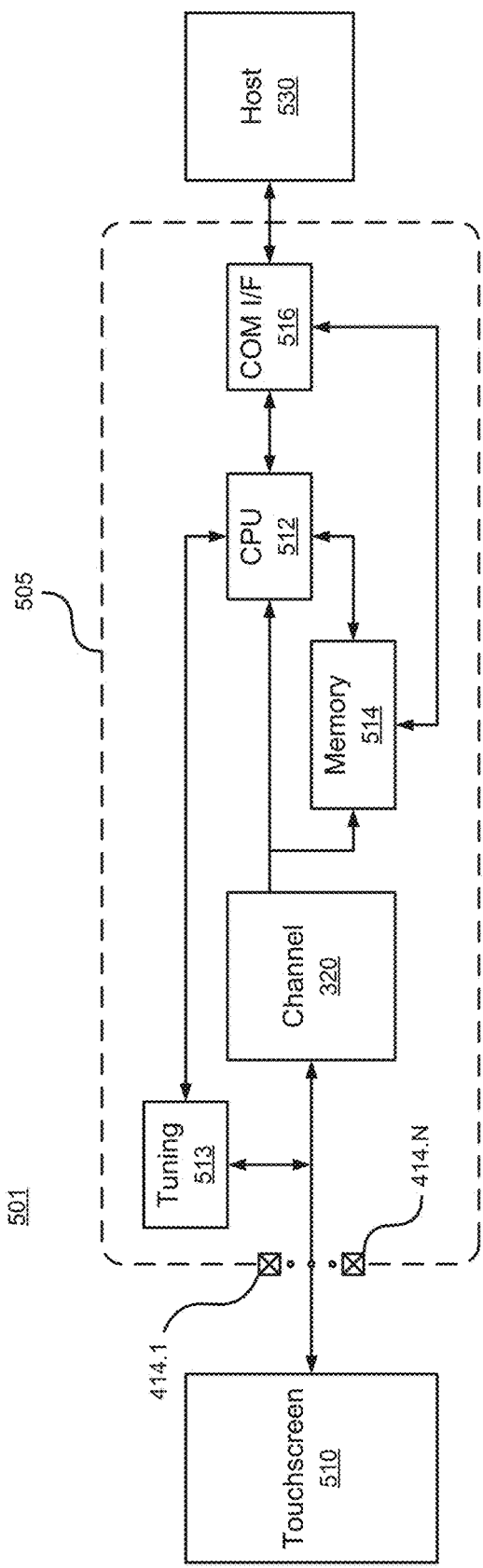
FIG. 5 illustrates a flow of information and control signals in a capacitance sensing system, according to one embodiment.

FIG. 5 illustrates one embodiment of a touchscreen system 501. A touchscreen 510 may be coupled to a sensing IC 505 though pins 414 (e.g., 312 in FIG. 3A, 313 and 314 in FIG. 3B, and 414 in FIGS. 4A and 4B). Sensing IC 505 may comprise a channel 320 coupled to the touchscreen electrodes of touchscreen 510 (illustrated in FIGS. 2A and 2B). In one embodiment, the output of channel 320 may be sent to CPU 512 for processing (as shown in FIGS. 3A and 3B) and then either communicated to a host 530 through communication interface 516 or stored in a memory 514 and communicated to host 530 through communication interface 516 from memory 514. In another embodiment, the output of channel 320 may be stored in memory 514 directly (before processing by CPU 512) and either processed by CPU 512 from memory 514 and then communicated to host 530 through communication interface 516 or communicated to host 530 from memory 514 through communication interface 516 without CPU intervention. Tuning and calibration routines may be stored in memory 514 and implemented by CPU 512 through tuning block 513. Calibration of signals from touchscreen 510 through and by channel 320 may provide capacitance measurement data with greater signal-to-noise ratios and fidelity to user interactions.

Capacitance measurement data from channel 320 may be representative of the total capacitance measured by channel 320. That is, the capacitance of self or mutual capacitances of FIGS. 1A through 1C may be converted to a digital value. The digital value may include the parasitic capacitance (318 of FIGS. 3A and 3B) as well as the native mutual capacitance with no figure present (311 of FIG. 3B) and the capacitance of the conductive object or finger. The parasitic capacitance and native mutual capacitance may be subtracted from the measured value as a baseline to yield difference values that are representative of the capacitance from the conductive object or finger. Difference values may be analyzed by processing block 330 to determine if a conductive object is proximate to the array as well as higher-level user interactions.

CPU 512 or host 530 may further use capacitance and/or difference values to detect various types of objects and interactions. In various embodiments, different levels of data may be communicated to host 530 for processing away from CPU 512. While CPU 512 may perform all of the processing in the specification below, more or less of the data analysis and manipulation may be off-loaded to host 530 based on the processing requirements and overhead of CPU 512, host 530, and the system operation generally.

Figures 6A, 6B, 6C:
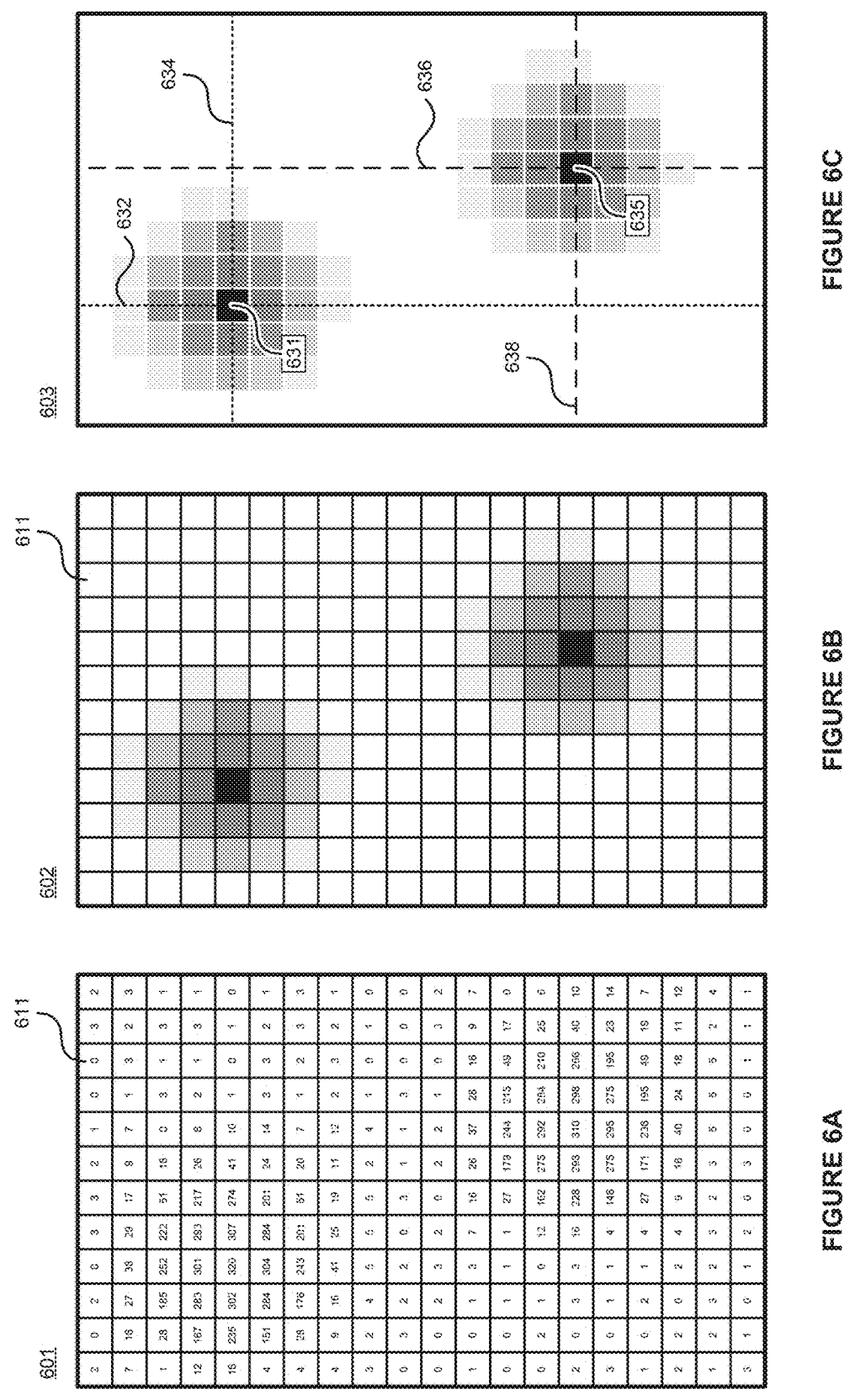

FIG. 6A illustrates numerical difference values 601 for a plurality of intersections 611 of a mutual capacitance sensing array. Numerical difference values 601 may be derived from the raw values of, for example, channel 320 (FIG. 3B) for every unit cell (229 of FIG. 2A and 239 of FIG. 2B) or mutual capacitance, $C_M$, 311 (FIG. 3B). In one embodiment, numerical difference values may be the difference between the raw count values output from channel 320 and a baseline value. In one embodiment, the baseline value may be stored globally for the entire array. In another embodiment, the baseline value may be stored for each intersection individually. In another embodiment, the baseline value may be stored for multiple groups of sensors depending on each sensor's position on the touchscreen, noise performance of individual sensors, other design restraints. Baseline values may be determined during development in one embodiment. In another embodiment, baseline values may be calculated at start-up or may be updated during operation of the touchscreen to account for variations in noise experienced by the touchscreen electrodes, physical changes on the touchscreen (heat, humidity, etc.), or other sources of drift in the output channel (e.g., channel 320).

The numerical difference values 601 of FIG. 6A may be illustrated graphically as heat map 602 in FIG. 6B. The shade of each cell or mutual capacitance 601 of heat map 602 may indicate of the numerical difference values 601 of FIG. 6A. Darker cells may indicate of greater capacitive coupling of a mutual capacitance electrode with a conductive object and less capacitive coupling between the mutual capacitance electrodes themselves. For clarity of description, the representation illustrated in FIG. 6B is used for subsequent figures.

FIG. 6C illustrates an example of peak detection scheme 603 based on the data from FIGS. 6A and 6B. The peak detection scheme 603 may compare each unit cell (229 of FIG. 2A and 239 of FIG. 2B) or mutual capacitance 611 (FIGS. 6A and 6B) to those around it. Peak detection may use a sum of the surrounding values to provide a common mode filter to peak detection, as shown FIGS. 10B and 10D. Unit cells or mutual capacitance intersections with the highest different value may be identified as peaks and given an identifier and position. A first peak 631 may be given a first position (X-axis 632 and Y-axis 634). A second peak 635 may be given a second position (X-axis 636 and Y-axis 638).

Figure 6F:
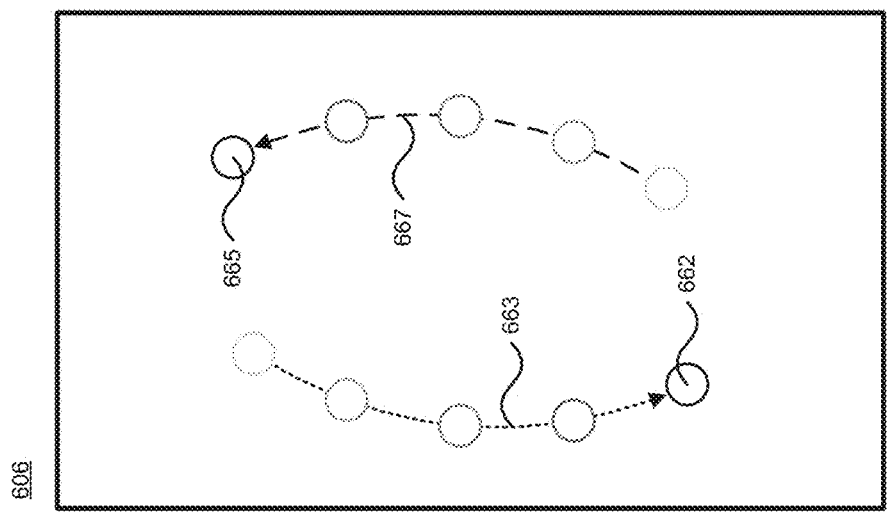
FIG. 6F illustrates a representation of tracking a plurality of conductive objects moving across a capacitance sensing array.
Figure 6E:
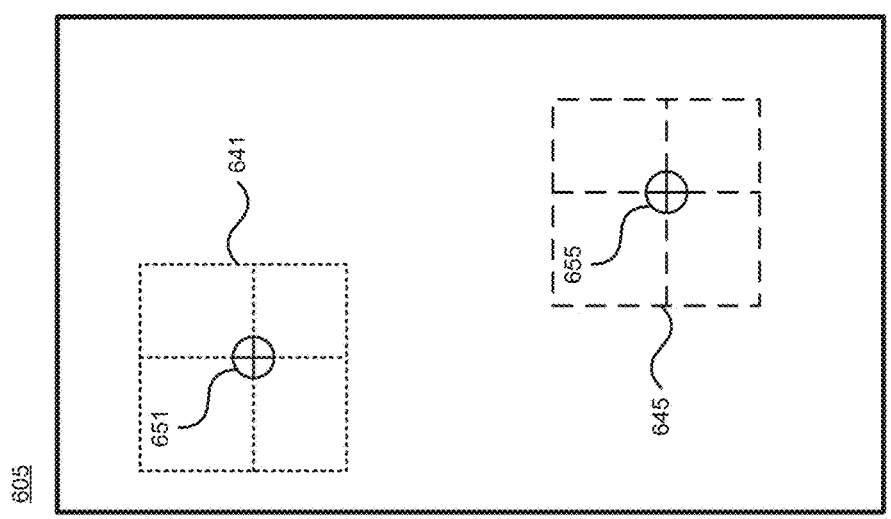
FIG. 6E illustrates the result of a centroid calculation with a 5×5 window of sensors for two conductive objects, according to one embodiment.
Figure 6D:
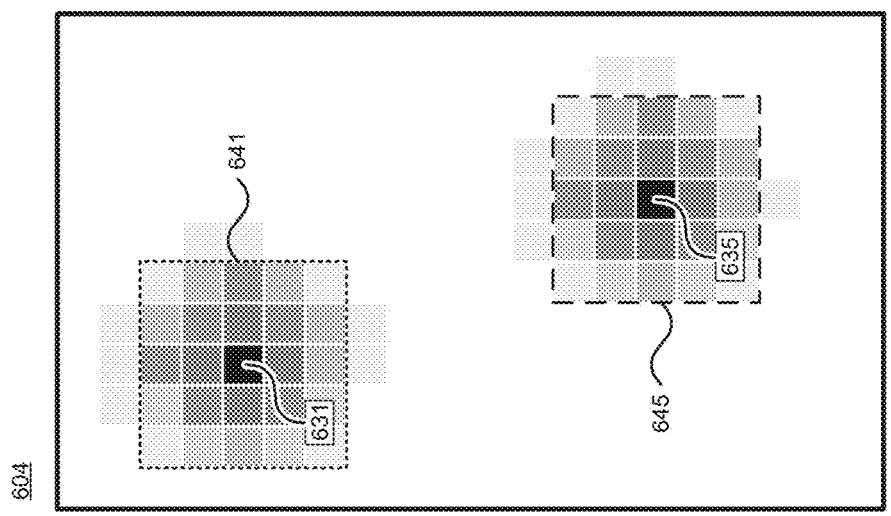
FIG. 6D illustrates a centroid calculation with a 5×5 window of sensors, according to one embodiment.

FIG. 6D illustrates an example of centroid calculation 604 wherein an array of sensors surrounding each peak is defined and processed. A centroid for each peak may be given by:

$$P = \frac{S_{i-2}(i-2) + S_{i-1}(i-1) + S_i(i) + S_{i+1}(i+1) + S_{i+2}(i+2)}{S_{i-2} + S_{i-1} + S_i + S_{i+1} + S_{i+2}}, \quad (3)$$

where P is the calculated position, i is the unit cell under test, and $S_i$ is the signal at each unit cell (under test and surrounding unit cells).

First peak 631 may be used to define a first array 641 including the 25 unit cells around and including the unit cell at first peak 631. Second peak 635 may be used to define a second array 645 including the 25 unit cells around and including peak 631. The values of first array 641 and second array 645 may be processed to find the centroid or center of mass of the conductive object based on the values contained within each array (641 and 645). While symmetrical 5×5 arrays are illustrated in and describe with regard to FIG. 6D, in various embodiments, the arrays may have different dimensions and consequently different numbers of unit cells. Such various embodiments may include 3×3, 4×4, or larger arrays. The arrays may position peaks in the center or the peaks may be offset. Additionally, the arrays may be asymmetrical, with a greater number of rows or columns, or irregular, where each row or column may have a different number of unit cells.

FIG. 6E illustrates an example of the first and second centroids 651 and 655 calculated from first and second arrays 641 and 645 of FIG. 6D, when no virtual sensors are determined activated.

FIG. 6F illustrates an example of two conductive objects 661 and 665 moving across a touchscreen and their positions along tracks 663 and 667, respectively.

FIG. 7A illustrates one embodiment of a touchscreen stackup of touchscreen system 501 (from FIG. 5). Touchscreen stackup 701 may include a display 740. Above display 740 may be disposed a sensor layer 750. Between sensor layer 750 and a conductive object, such as a finger or stylus, may be disposed a cover layer 760.

While sensor layer 750 is shown to be on the same layer of a substrate, this is merely exemplary. In one embodiment, sensor layer 750 may be disposed on the bottom of cover layer 760, reducing the number of layers from three to two in touchscreen stackup 701. In another embodiment, sensor layer 750 may be disposed on the top of display 740, also removing a layer from touchscreen stackup 701. In another embodiment one or both axes of the electrodes shown on sensor layer 750 may be disposed at various depths within the display. For example, sensor layer 750 may implemented as in-cell, on-cell, or a hybrid of in-cell and on-cell. Additionally, sensor layer 750 may share certain electrodes with display 740.

Touchscreen stackup 701 is illustrated in a touchscreen system 702 in FIG. 7B, according to one embodiment. Touchscreen/display 705 (analogous to touchscreen stackup 701 of FIG. 7A) may be coupled to touch controller 710 and display controller/driver 715. Touch controller 710 may be configured to sense either self capacitance (FIG. 3A) or mutual capacitance (FIG. 3B) or both. The output of the touch controller 710 may be communicated to an application processor 730. Touch controller 710 may also be configured to receive commands and data from application processor 730. Information that may be communicated to application processor 730 by touch controller 710 may include the following data for each identified conductive object on the array:

- Age of Detection—How long (in number of scans) a touch has been present on the touchscreen;
- X-Axis Position—The position along the horizontal axis of the conductive object on the array;
- Y-Axis Position—The position along the vertical axis of the conductive object on the array;
- Z-Axis Intensity—The strength of the touch which may be indicative of the size of the conductive object or the pressure with which the conductive object presses against the touch surface (in some embodiments, Z-axis intensity may be used to indicate a distance of an object from the surface or sensing electrodes);
- Contact Area Major Axis Length—The long axis of an ellipse centered on the location of the conductive object on the array;
- Contact Area Minor Axis Length—The short axis of an ellipse centered on the location of the conductive object on the array;
- Contact Area Major Axis Angle—The angle (from vertical) of the long axis of an ellipse centered on the location of the conductive object on the array;
- Touchdown/Liftoff Debounce—Whether there is debounce (or hysteresis) for the detection of the conductive object on the array and whether/where the detection is within the debounce;
- Conductive Object Identification—The type of touch (bare finger, gloved finger, stylus, hover, proximity, etc.);
- Conductive Object Size—Large conductive object or a regular-sized conductive object;
- Virtual Sensor Activation State—identify, location, and signal level of various active virtual sensors; and
- Gestures (discussed in more detail with regard to FIGS. 8A through 8G).

Application processor 730 may also be coupled to display controller/driver 715 to control what is shown on touchscreen/display 705.

Figure 8A:
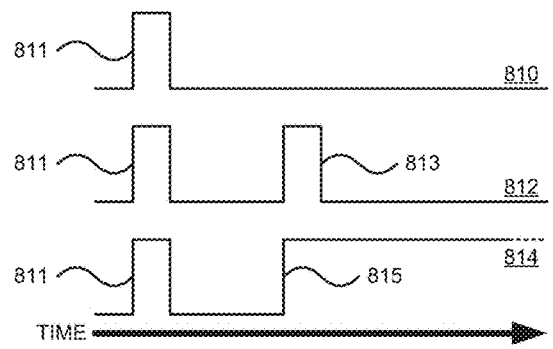
FIG. 8A illustrates contact timing diagrams for tap, double-tap, and click-and-drag gestures, according to one embodiment.
Figure 8B:
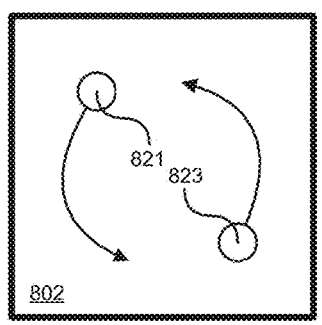
FIG. 8B illustrates a plurality of conductive objects moving across a capacitance sensing array to produce a "rotate" gesture, according to one embodiment.
Figure 8C:
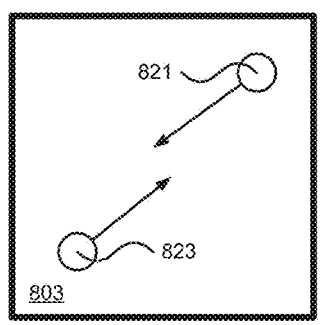
FIG. 8C illustrates a plurality of conductive objects moving across a capacitance sensing array to produce a "pinch" or "zoom-out" gesture, according to one embodiment.
Figure 8D:
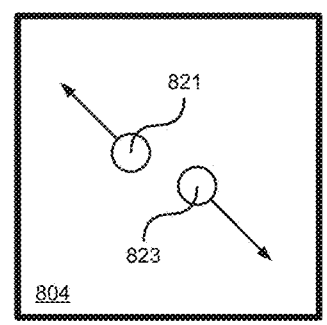
FIG. 8D illustrates a plurality of conductive objects moving across a capacitance sensing array to produce a "grow" or "zoom-in" gesture, according to one embodiment.
Figure 8E:
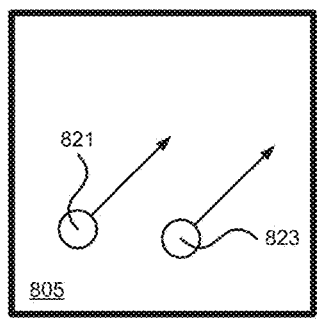
FIG. 8E illustrates a plurality of conductive objects moving across a capacitance sensing array to produce a "pan" gesture, according to one embodiment.

FIG. 8A illustrates examples of capacitance measurement data for a single conductive object as might be interpreted to be single-touch gestures. A detection of a conductive object in FIG. 8A is illustrated as a digital ON/OFF or HIGH/LOW of the conductive object on the capacitance sensor. A single-tap gesture 810 may be detected as a presence of a conductive object detected and then the absence of a conductive object detected to define first touch 811. A double-tap gesture 812 may be detected as a presence of a conductive object detected and then the absence of a conductive object detected to define a first touch 811, then within a specified time a second touch 813 detected. A click-and-drag gesture 814 may be detected as a presence of a conductive object detected and then the absence of a conductive object detected to define a first touch 811, then within a specific time a second touch 815 detected. A click-and-drag gesture may also move a cursor on a display as the second touch remains on the touch surface and moves across the surface.

FIGS. 8B through 8E illustrate examples of gestures based on detection of two conductive objects. In one embodiment, conductive objects 821 and 823 may move in a circular motion about some center point, either clockwise or counter-clockwise to produce a rotate gesture 802. In another embodiment, conductive objects 821 and 823 may move closer together along a substantially linear path to produce a "pinch" or "zoom out" gesture 803. In another embodiment, conductive objects 821 and 823 may move farther apart along a substantially linear path to produce a "grow" or "zoom in" gesture 804. In another embodiment, conductive objects 821 and 823 may move along substantially parallel paths to produce a "pan" gesture 805.

Figure 8F:
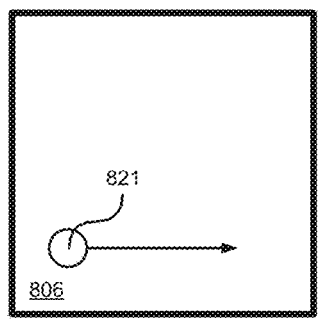
FIG. 8F illustrates a conductive object moving across a capacitance sensing array to produce a "next item" or "next page" gesture, according to one embodiment.
Figure 8G:
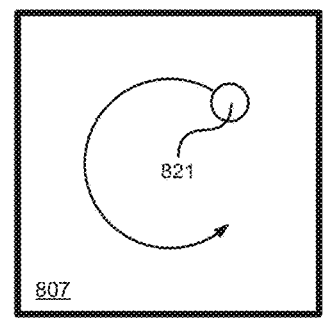
FIG. 8G illustrates a conductive object moving across a capacitance sensing array to produce a "scroll" gesture, according to one embodiment.

FIGS. 8F and 8G illustrate gestures based on detection of a single contact moving across a capacitance sensing array. In one embodiment, conductive object 821 may move in a substantially straight line to produce a "next item" gesture 806. In another embodiment, conductive object 821 may move in a circular motion about some center point, either clockwise or counter-clockwise to produce a scroll gesture 807.

Gestures of FIGS. 8A and 8C-8F may be detected on virtual sensors to achieve additional functionality without a user contacting the touchscreen directly.

Figure 9:
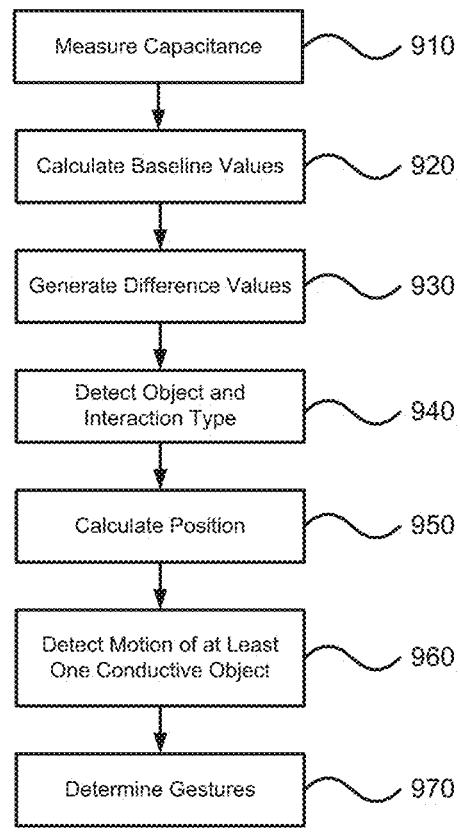
FIG. 9 illustrates a method for measuring capacitance on a touchscreen and outputting a result, according to one embodiment.

FIG. 9 illustrates one embodiment of a method 901 of sensing a touchscreen array and determining the appropriate display. Capacitance is first measured in step 910. Step 910 may correspond to self capacitance measurement or mutual capacitance measurement and may use sensing circuits similar to those described in FIG. 3A or 3B. In other embodiments, other self or mutual capacitance sensing methods may be used. Raw capacitance values may be used to create a baseline in step 920. Baseline values may then be subtracted from the raw capacitance values in step 930 to generate difference values (as shown in FIG. 6A). In one embodiment, difference values may be used to determine calibration parameters for hardware configuration. Calibration parameters may include coupling various unit cells (e.g. 229 and 239 of FIGS. 2A and 2B, respectively) to drive signals such that bias currents are provided to the digital conversion of a measurable capacitance (e.g. FIG. 10, below). Difference values from step 930 may be used to determine the type of object (e.g. bare finger, gloved finger, or stylus) that has influenced the measured capacitance values as well as the type of interaction (e.g. contact of hover) in step 940. Once the type of object and interaction has been determined, the position of that object may be calculated in step 950. Successive processing of positions from multiple scans may be used to detect motion of at least one object over the array of capacitance sensing electrodes in step 960 and the motions of those objects, as well as their mere presence or absence may be used to determine gestures in step 960 as illustrated in FIGS. 8A through 8G. At any of the steps of method 900, data may be communicated directly to host 530 of FIG. 5. This may allow for faster processing or off-load the touch controller (using CPU 512) to perform other processing of analysis of the capacitance sensing information.

In one embodiment, the entire method 901 of FIG. 9 may be completed by touch controller 710 of FIG. 7. In another embodiment, various steps of method 901 may be completed by an external processor such as application processor 730 of FIG. 7. In this embodiment, data may be communicated to and from touch controller 710 through communication interface 516 of FIG. 5. Information communicated to the host may be stored in a memory (such as memory 514) or communicated through a processing unit (such as CPU 512). In another embodiment, additional processing steps may be completed by touch controller 710 or application processor 730 and the results of those steps used in performing the steps of method 901 illustrated in FIG. 9.

Hover Detection and Processing

Figures 10A, 10B:
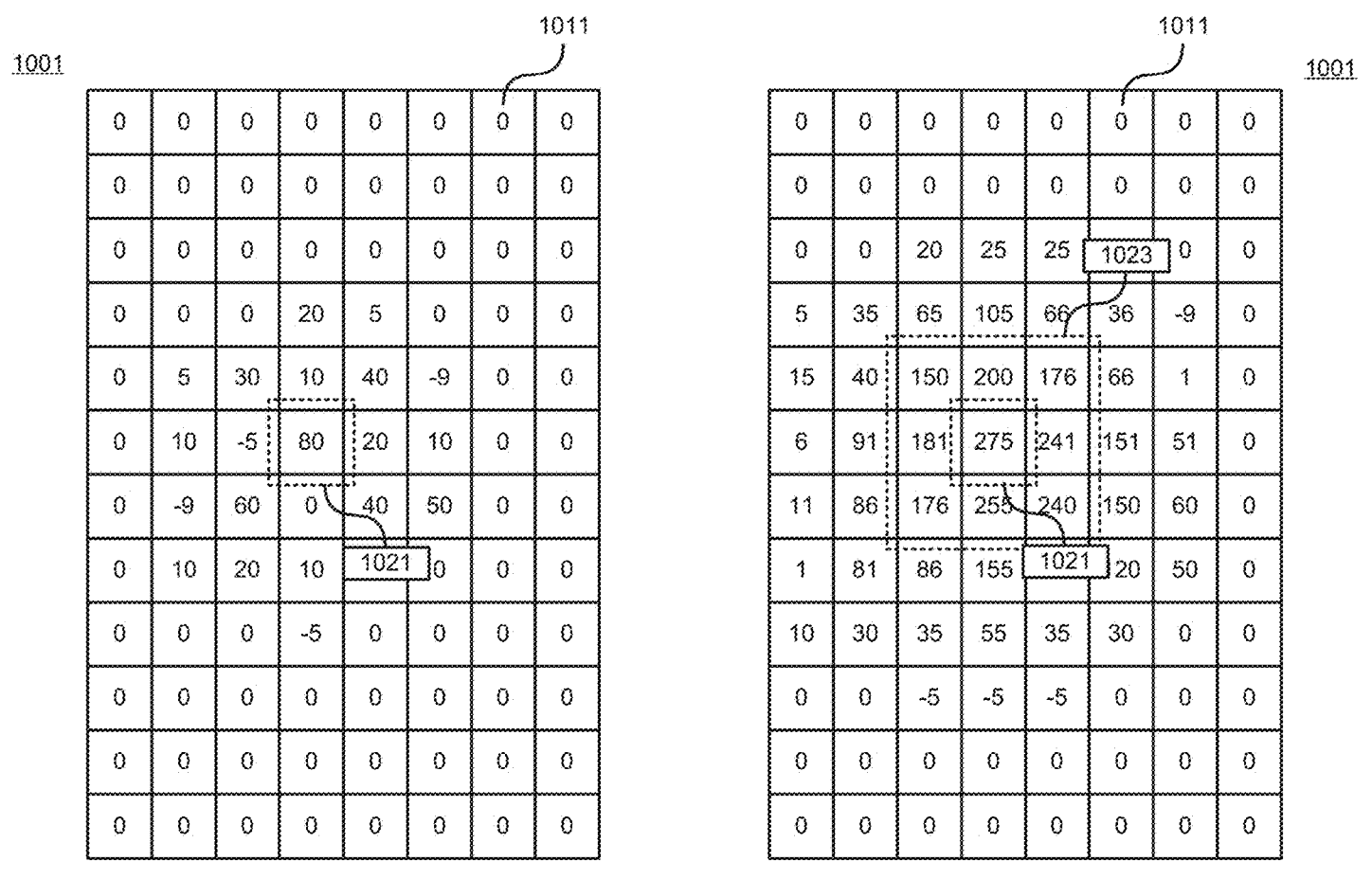

A contact hovering over an array of sensors like those shown in FIGS. 2A and 2B may generate significantly lower difference values than the difference values shown in FIG. 6A and with far greater relative variability across the panel and over time. An example of this is illustrated in FIG. 10A, wherein an 8×12 array 1001 of mutual capacitance sensors (unit cells) 1011 may have difference values with a maximum of 80, unit cell 1021, and a minimum of −9, meaning that the noise in the system may be such that the measured capacitance is actually lower than the baseline. Because a contact hovering above array 1001 may move in a direction perpendicular to a plane defined by the array and very small movements may have a large impact on the calculated difference values, an identified peak unit cell (illustrated in FIG. 6C) may move quickly between successive scans of the array, wherein each scan measures the capacitance of a necessary number of unit cells, or intersections between rows and columns of electrodes.

FIG. 10B illustrates an embodiment of the 8×12 array 1001 of mutual capacitance unit cells 1011 wherein a value of each intersection is replaced with a sum difference values about each unit cell. In this embodiment, the unit cell 1021 now has a value of 275, which is the sum of the previous peak of 80 and the eight other unit cells surrounding the previous peak and contained within a 3×3 matrix of unit cells 1023. Each unit cell (e.g., unit cell 1011) in the [array 1001 of mutual capacitance unit cells] may also be summed with its surrounding other eight unit cells, which results in the values shown in FIG. 10B for the unit cell 1021 and the grouping of unit cells 1023. This summing process for each unit cell may reduce the impact of noise on specific unit cells by compensating with similarly positioned unit cells in the aggregate. That is, no one unit cell may be too influential on the value used to determine a peak unit cell that noise experienced by the system or specific unit cell or electrode may dominate the detection of a peak and a subsequent calculation of a position of a hovering conductive object above the array.

FIG. 10C illustrates another embodiment of an 8×12 array 1003 with mutual capacitance values for each unit cell. The unit cell with the highest value (peak) is 24, corresponding to unit cell 1031 (E4). In this example, the peak at unit cell 1031 is only a single unit higher than three other cells (E5, D6, and E6) and the peak may move with only a minor movement of a contact over the array 1001 or in response to noise, causing jitter in the detection and position calculation from steps 940 and 950 of FIG. 9.

FIG. 10D illustrates an embodiment of the 8×12 array 1001 of FIG. 10C with each of the middle 4×8 unit cells (columns C-F and rows 3-10) summed with the remaining 24 unit cells comprising a 5×5 matrix of unit cells (1033 from FIG. 10C). In this embodiment, the highest value (peak 1042) is 362, corresponding to cell E6. Cell E6 has a value 14 units greater than the next highest cell (E5). This means that small changes in the capacitance may be less likely to move the peak, allowing for a more stable window of values for calculating hover position.

Figure 11A:
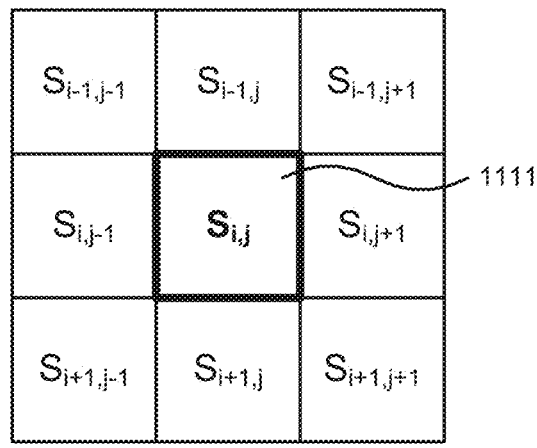
FIG. 11A illustrates a 3×3 matrix of unit cells, according to one embodiment.

FIG. 11A illustrates one embodiment of a 3×3 matrix of unit cells 1101 that may be used to calculate a processed capacitance for each unit cell. In the embodiment of FIG. 11A, a unit cell under test, 1111, may be updated to include the sum of the values of each unit cell within one unit cell above, below, left, and right of the unit cell under test. Just as illustrated in FIG. 10B for the unit cell from FIG. 10A with a value of 80, the new value may be 275. While a 3×3 matrix of unit cells 1101 is shown in FIG. 11A, one of ordinary skill in the art would understand that matrices of different dimensions and shapes may be used. Furthermore, while a square fully populated matrix is shown, one of ordinary skill in the art would understand that matrices with rounded corners (missing cells) may be used. In one embodiment, a 5×5 matrix may be used (e.g. 1033 of FIG. 10C), including the unit cell under test 1111 and the 24 surrounding unit cells. In the example from FIG. 10B, using a 5×5 matrix the unit cell with a value of 80 from FIG. 10A would then have a value of 445.

Figure 11B:
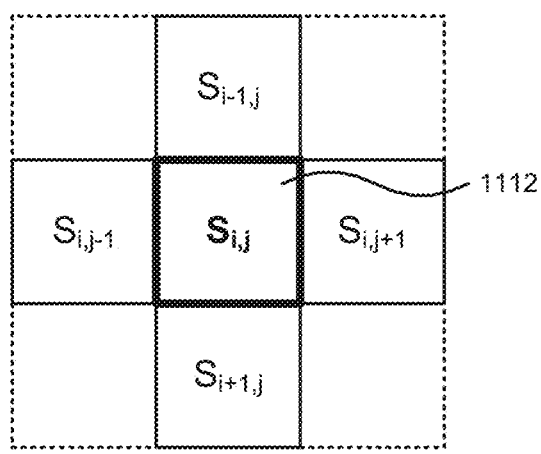
FIG. 11B illustrates a 5-sensor group of unit cells with additional sensors at each cardinal direction, according to one embodiment.

FIG. 11B illustrates an embodiment of a 5-unit cell group of unit cells 1102 that may be used to calculate a processed capacitance for each unit cell. In the embodiment of FIG. 11B, a unit cell under test, 1112, may be updated to include the sum of the values of each unit cell immediate above, below, left, and right of the unit cell under test 1112. In the 5-sensor matrix of unit cells 1102, unit cells located diagonal from the unit cell under test may not be included in the processed capacitance. In this embodiment, the example from FIGS. 10A and 10B with a difference value of 80 may be updated to be 105.

In another embodiment, a 9-sensor matrix may be used, including values of the two unit cells immediately above, below, left, and right of the unit cell under test 1112, In this embodiment, the above example may be updated to have a processed capacitance of the unit cell under test 1112 of 155. In still another embodiment, only the values along diagonals from the unit cell under test 1112 may be used. One of ordinary skill in the art would understand that various combinations of unit cells may be used that include unit cells representative of the array and the unit cell under test.

Figure 12:
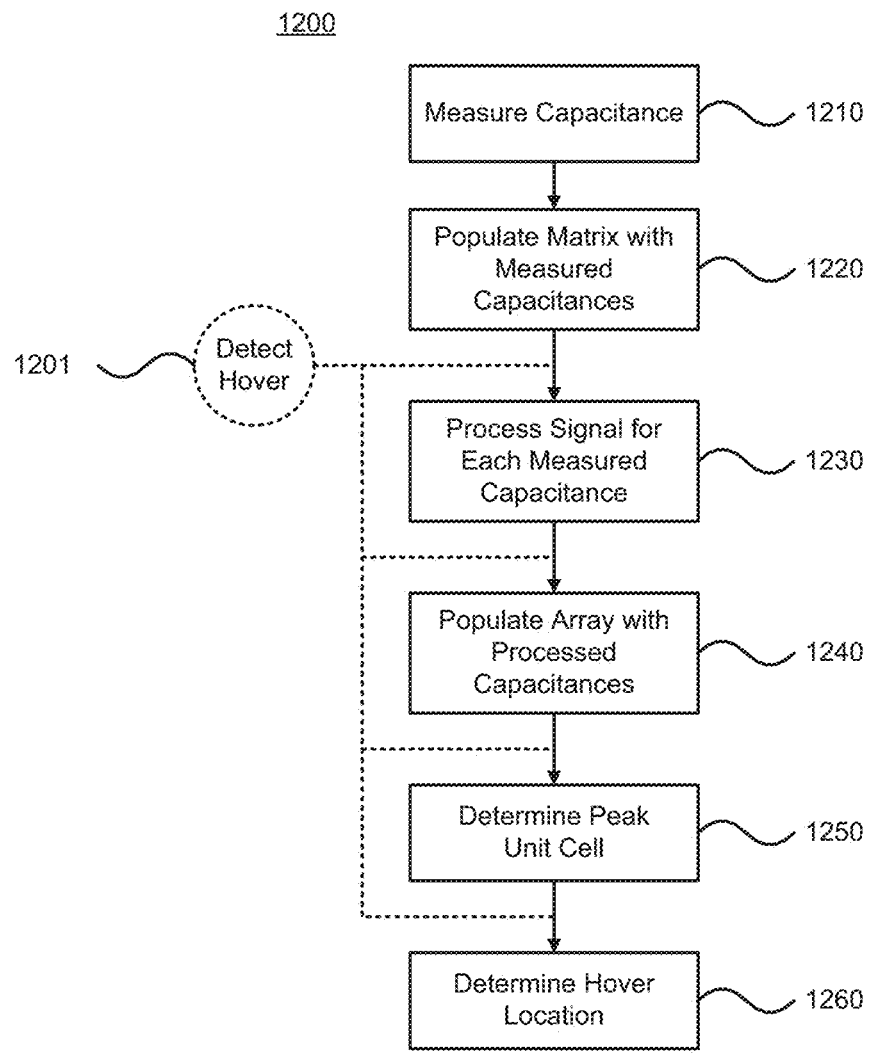
FIG. 12 illustrates an embodiment for detecting hover and calculating position with summed values, according to one embodiment.

FIG. 12 illustrates one embodiment of a method 1200 for generating processed capacitances for unit cells for hover position calculation. Capacitance may be first measured in step 1210. In various embodiments, capacitance may be measured according to FIG. 3A or 3B or other self or mutual capacitance methods useful for determining a change in capacitance as a plurality of intersections of mutual capacitance electrodes or at location of self capacitance electrodes. After capacitance is measured in step 1210, each measured capacitance may be stored in a location corresponding to each intersection, or unit cell, in the array in step 1220. The measured capacitance may be stored as the raw capacitance value converted to a digital value in one embodiment. In another embodiment, the measured capacitance may be stored as the difference between the raw capacitance value and a baseline value. In various embodiments, the baseline value may be static, dynamic, global to the entire array of unit cells, specific to each unit cell, or some combination of each. In step 1230, the value at each unit cell may be updated as described with regard to FIGS. 11A and 11B, The array may then be updated with the processed capacitance values in step 1240. The processed capacitance values from steps 1230 and 1240 may then be used to determine a peak at least at one peak unit cell in step 1250. The peak unit cells(s) from step 1250 may then be used to calculate position of a contact hovering above the capacitance sensing electrodes in step 1260. Peak unit cell detection may be completed as shown in FIGS. 10 and 11. At various stages, a hover may be detected (as opposed to a touch of the surface or some other interaction between a conductive object and the capacitance sensing electrodes) in block 1201. If a hover is not detected, before various steps of method 1200, the remaining steps may not be completed and the capacitance of each electrode or unit cell of electrodes may be measured again, or some other processing of the capacitance values completed.

Figure 13:
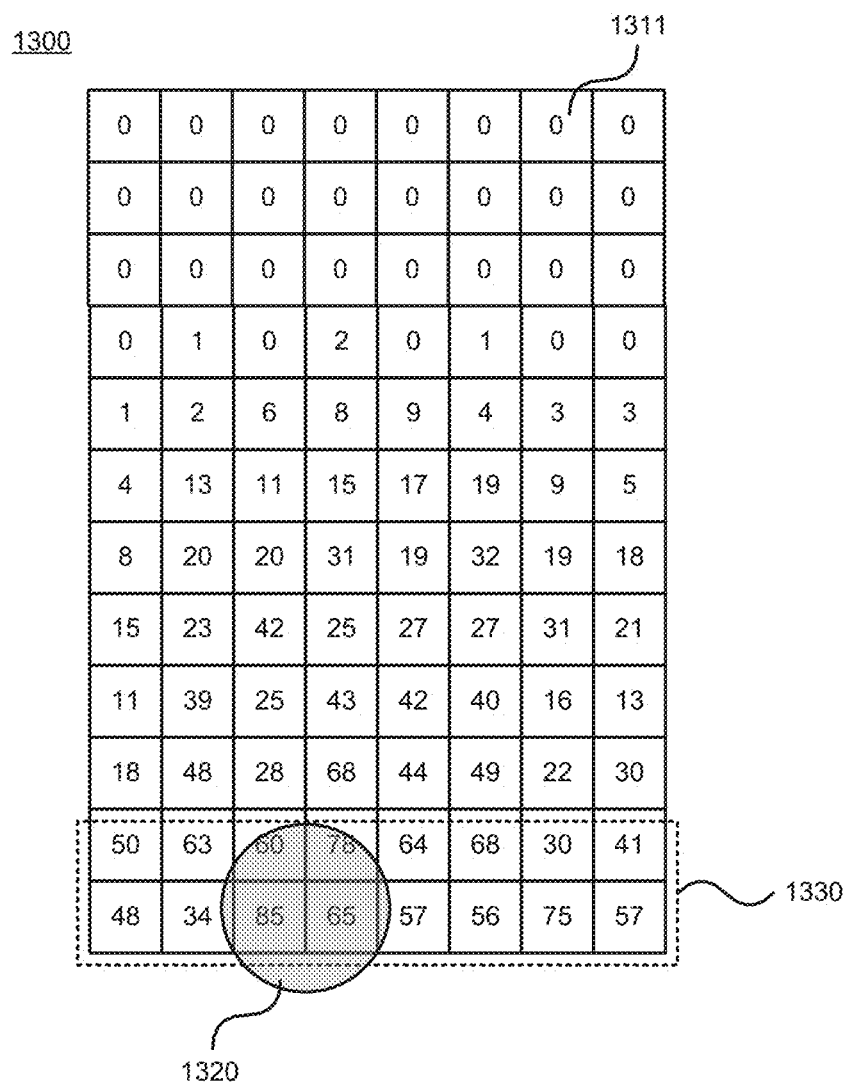
FIG. 13 illustrates an array of unit cells with an edge zone, according to one embodiment.

As a hovering conductive object nears the edge of an array, the amount of capacitance change from the conductive object detected by the electrodes of the array may drop such that the calculated position of a hovering contact is no longer representative of the actual position. FIG. 13 illustrates one embodiment of an array 1300 of mutual capacitance sensors 1311 over which an object 1320 is hovering. The measured capacitance values of each unit cell may be low enough and with high enough variability so as to make position calculation at the edge an array imprecise. Consequently, an edge zone 1330 may be identified in which a correction factor may be applied. While a single edge zone 1330 is shown in FIG. 13, edge zones may be defined for each edge/axis.

Figure 14A:
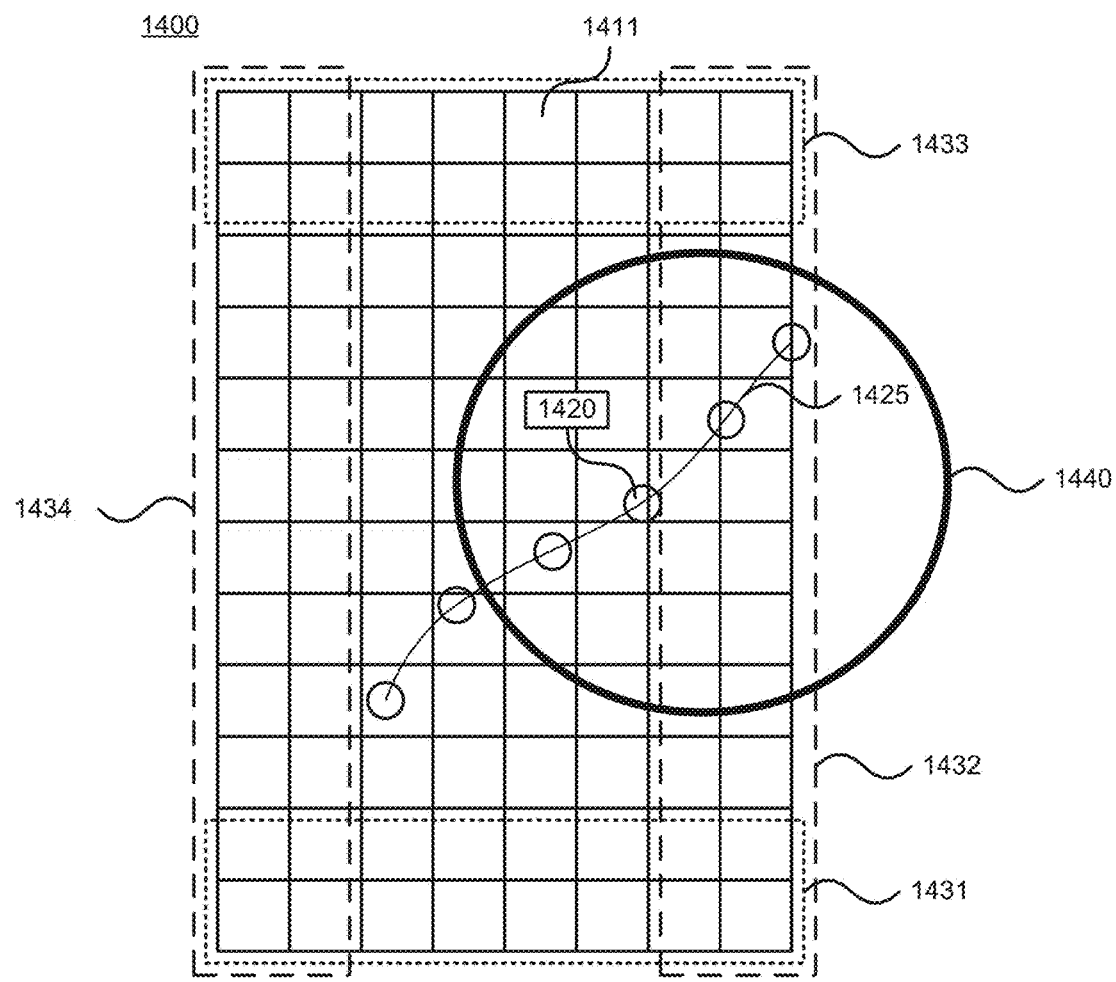
FIG. 14A illustrates an array of unit cells with a path of a hovering contact an edge zones at each edge of the array, according to one embodiment.

FIG. 14A illustrates an embodiment of an array 1400 of mutual capacitance unit cells 1411, wherein each axis has two edge zones defined at each side of the array. Edge zones 1431 and 1432 may be defined for positions along the top and bottom of the array. Edge zones 1433 and 1434 may be defined for positions along the left and right of the array. A conductive object 1420 may be detected by the array 1400 and capacitance measurement and processing circuitry (e.g., 301 or 302 of FIGS. 3A and 3B) as it moves toward the right edge of the array 1400 and into edge zone 1433. Conductive object 1420 may move along a path 1425.

Figure 14B:
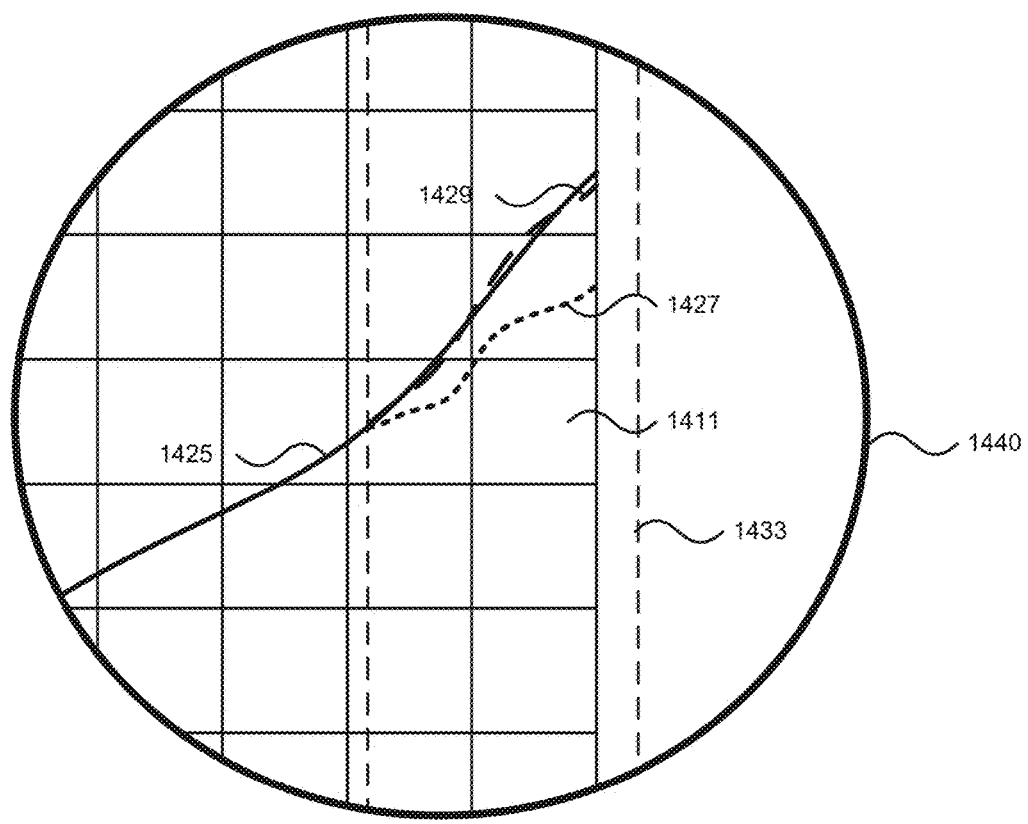
FIG. 14B illustrates a close-up of the array from FIG. 14A with actual, detected, and corrected paths for a hovering contact, according to one embodiment.

FIG. 14B illustrates a close up view of section 1440 from FIG. 14A. Path 1425 is illustrated as the actual position of conductive object 1420 above array 1400 from FIG. 14A. As conductive object 1420 moves into edge zone 1433, an uncorrected position of the path may begin to differ significantly from the actual position along path 1425. Consequently, once the position of the conductive object is calculated to be within edge zone 1433, a correction scheme as discussed herein may be applied to generate a corrected path 1429. In various embodiments corrected path may have more or less fidelity to path 1425, however, the difference between corrected path 1429 and path 1425 is smaller than the difference between path 1427 and path 1425. In still other embodiments, determination of an object to be within an edge zone may be by a calculated position, by particular unit cells recognized as peaks, or sums groups of sensors at or near the edge of the array of unit cells.

In one embodiment, the same correction scheme may be applied to conductive objects detected in each zone. In another embodiment, a different scheme may be applied to each axis or near of far sensors (from the connection of the electrodes to the sensing circuitry). In this embodiment a correction position for conductive objects near to the connection of the electrodes of the sensing circuitry may be given by:

$$P' = \begin{cases} \alpha*P - (\alpha-1)B, P > \frac{\alpha-1}{\alpha}B \\ 0, \text{else} \end{cases} \quad (4)$$

where P is the uncorrected value of the X position or Y position, P' is the corrected value of the X position or Y position, B is the position of the border of the edge zone, and α is a correction coefficient (greater than 1). A correction position for conductive objects far from the connection of the electrodes of the sensing circuitry may be given by:

$$P' = \begin{cases} \alpha*P - (\alpha-1)B, P > \frac{P_{max}+\alpha-1}{\alpha}B \\ P_{max}, \text{else} \end{cases} \quad (5)$$

where P is the uncorrected value of the X position or Y position, P' is the corrected value of the X position or Y position, B is the position of the border of the edge zone, $P_{max}$ is the maximum possible position value, and a is a correction coefficient (greater than 1).

In another embodiment, a position may be scaled for the entire active area of the array, rather than just the zones at the edge of each axis. In this embodiment, position may be given by:

$$P' = (P-B)*\frac{\text{Max}}{P_{max}-2*B} \quad (8)$$

where P is the uncorrected value of the X position or Y position, P' is the corrected value of the X position or Y position, B is the position of the border of the edge zone, and $P_{max}$ is the maximum possible position value.

In another embodiment, position changed with a second order or higher order correction. In this embodiment, position may be given by:

$$P'=\alpha_2*(B-P)^2+\alpha_1*(B-P)+\alpha_0 \quad (9)$$

where P is the uncorrected value of the X position or Y position, P' is the corrected value of the X position or Y position, B is the position of the border of the edge zone, and $\alpha_i$ are correction coefficients (greater than 1).

For higher order corrections, position may be given by:

$$P'=\Sigma_{i=0}^{N}\alpha_i(B-P)^i \quad (10)$$

where P is the uncorrected value of the X position or Y position, P' is the corrected value of the X position or Y position, B is the position of the border of the edge zone, and $\alpha_i$ are correction coefficients (greater than 1).

Figure 15:
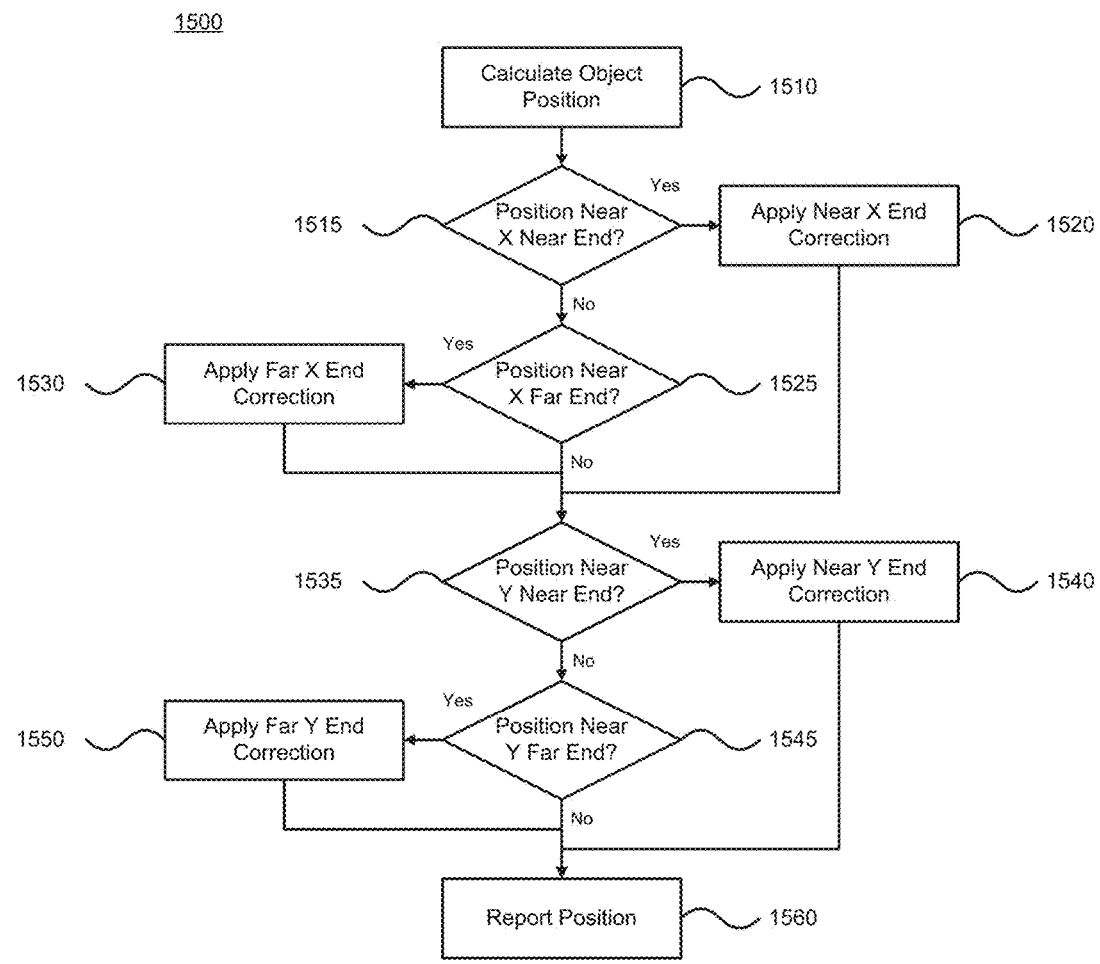
FIG. 15 illustrates a method for applying various correction factors based on a hover contact's presence in an edge zone, according to one embodiment.

FIG. 15 illustrates one embodiment of a method 1500 for correcting position of a conductive object hovering above an edge zone as illustrated in FIGS. 13, 14A, and 14B. The location of the conductive object may be first calculated in step 1510. If the location is within an edge zone along the near end of the X axis in step 1515, a near correction scheme may be applied in step 1520. After the near correction scheme is applied, method 1500 may progress to decision step 1535, wherein the position is compared to an edge zone along the near end of the Y axis. If the position is within the edge zone along the near end of the Y axis, a near correction scheme may be applied in step 1540. If, in step 1515, the location is not within an edge zone along the near end of the X axis, method 1500 may proceed to step 1525, wherein the position is compared to an edge zone along the far end of the X axis. If the position is within the edge zone along the far end of the X axis, a far correction scheme may be applied in step 1530 before method 1500 proceeds to step 1535. Similarly, if in step 1535, the location is not within an edge zone along the near end of the Y axis, method 1500 may proceed to step 1545, wherein the position is compared to an edge zone along the far end of the Y axis. If the position is within the edge zone along the far end of the Y axis, a far correction scheme may be applied in step 1550 and method 1500 may proceed to step 1560 and report the position. If the position is not within any edge zone, the calculated position from step 1510 may be reported without any correction from steps 1520, 1530, 1540, or 1550.

In one embodiment, formulae similar to that of equations (5) and (6) may be used. However, one of ordinary skill in the art would understand that different correction schemes may be used to produce positions of hovering conductive objects that are more faithful to the actual position of the hovering conductive objects over the array of electrodes. Similarly, while equations (5) and (6) are described as applicable to near X and Y positions and far X and Y positions, respectively, one of ordinary skill in the art would understand that different correction schemes may be used for each edge zone. Similarly, one of ordinary skill would understand that, while a single coefficient, $\alpha$, is applied to each equation and each zone, different coefficients may be used with the same equations for each edge zone. Different zone sizes may be used for different axes or for different sides of the array. In other embodiments, the edge zones may use a calculated position or the location of a peak unit cell. In still other embodiments, the shape and size of the edge zone may be changed based on the height of a measured peak or on the activation level (measured capacitance) on at least one capacitance sensing electrode or combination of capacitance sensing electrodes.

Identification and tracking of objects on a capacitance sensing array is highly sensitive to noise. For hover detection, noise represents a significant barrier to accurate and precise detection. The signal from a hovering conductive object may be considerably less than that of an object in direct contact with the sensing surface. As a result, a hover may be erroneously detected as the signal is amplified, or erroneously dropped because of changes in measured capacitance that are the result of system noise and not the actual change in capacitance.

Figure 16:
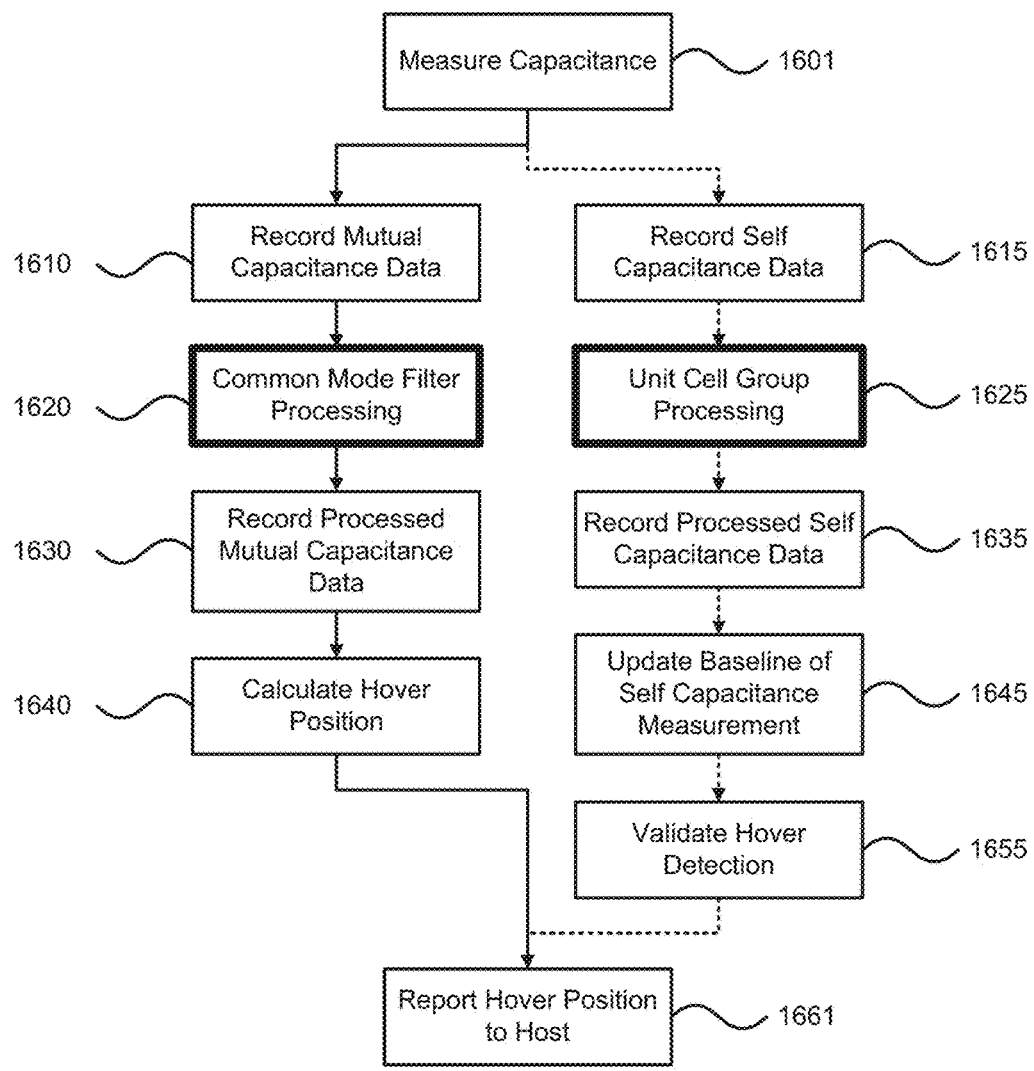
FIG. 16 illustrates a method for applying a common mode filter and verifying a hover detection, according to one embodiment.

FIG. 16 illustrates one embodiment of a method 1600 for detecting and confirming a conductive object hovering above an array of electrodes as illustrated in FIGS. 10A, 10C, and 14A and detected by system 501 of FIG. 5. Capacitance is first measured in step 1601. Capacitance measurement may be with both self capacitance measurement circuitry and mutual capacitance measurement circuitry. Following hover detection and position calculation with mutual capacitance, values of mutual capacitance at each of intersection (or unit cell) of an array may be recorded to a memory in step 1610. Mutual capacitance may be measured with the circuit shown in FIG. 3B and stored in a memory as shown in FIG. 5. After all of the mutual capacitance data are recorded, a common mode filter may be applied in step 1620. The details of the common mode filter processing of step 1620 are illustrated in more detail in the embodiments shown in FIGS. 17A and 17B. The processed mutual capacitance data, after the common mode filter of step 1620 is applied, may be recorded in step 1630 and a position of the conductive object hovering above the array of electrodes may be calculated in step 1640.

In parallel to the mutual capacitance measurement and processing of step 1610, 1620, 1630, and 1640, a valid hover may be confirmed using self capacitance measurement and processing. Self capacitance may be measured in step 1601. In one embodiment, a self capacitance measurement circuit similar to that shown in FIG. 3A may be used. The measured self capacitance values may be recorded in step 1615 and may be processed in unit cell group processing of step 1625. The processed self capacitance data may be recorded in 1635 and a baseline value which may be used in determination of valid hover updated in step 1645. The updated self capacitance baseline may be used to validate a hover detection in step 1655. If the hover detection of step 1655 is validated, the hover position calculated in step 1640 may be reported to a host in step 1661.

In one embodiment, method 1600 may be completed by CPU 512 of FIG. 5. In various other embodiments, portions of method 1600 may be completed by a combination of CPU 512, tuning logic 513, and host 520 of FIG. 5.

Figure 17A:
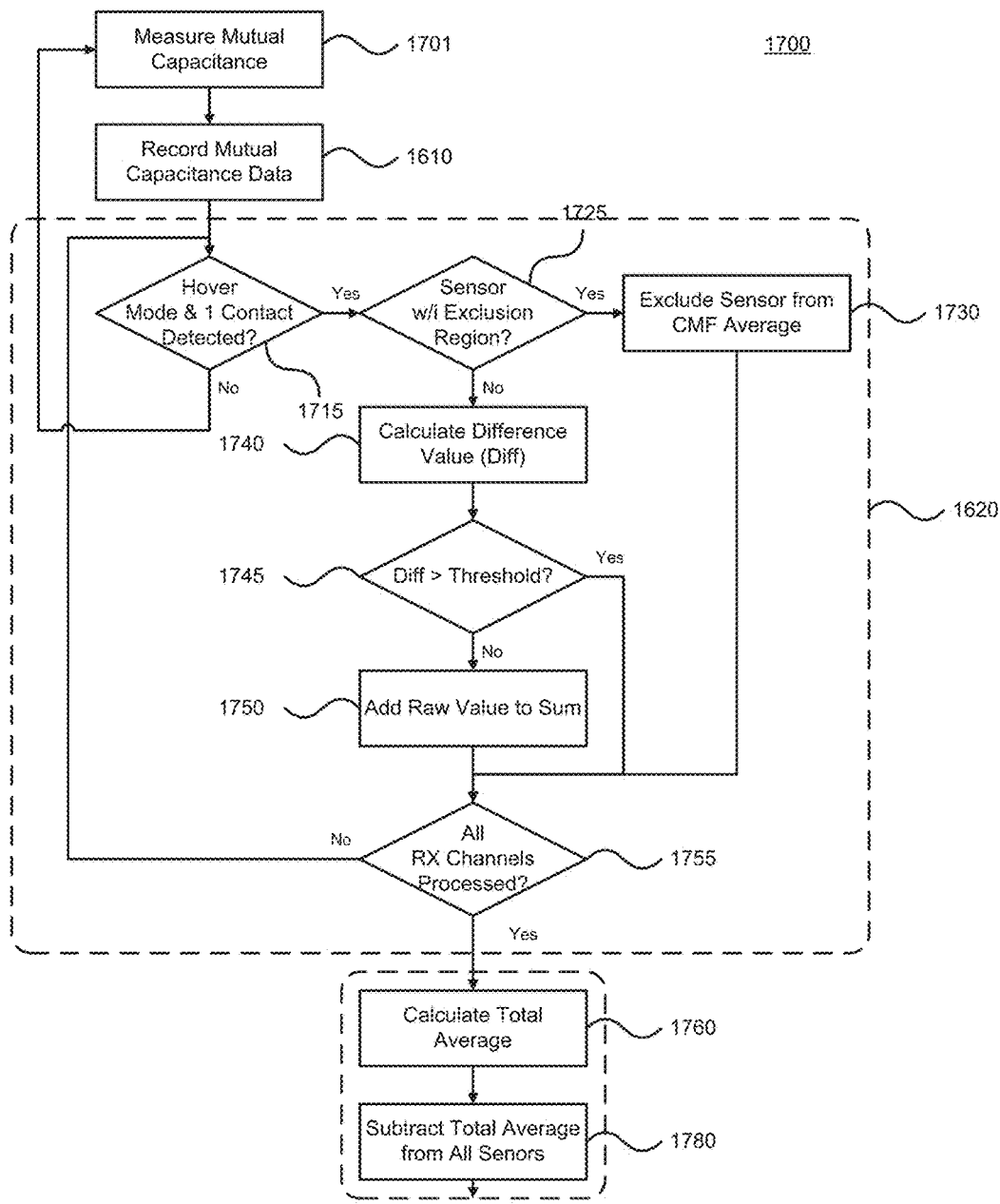
FIG. 17A illustrates a method for applying a common mode filter to hover data, according to one embodiment.

FIG. 17A illustrates one embodiment of a common mode filter of step 1620 method 1600. Mutual capacitance may be first measured in step 1701, similar to the capacitance measurement of step 1601 of method 1600 and using a circuit similar to that shown in FIG. 3B. After the mutual capacitance data is recorded in step 1610, method 1700 may confirm that the device is in hover mode and that at least one conductive object is detected by electrodes associated with or corresponding to unit cells as illustrated in FIGS. 10A-D, 13 and 14A and capacitance measurement circuitry and processing logic in step 1715. If there is no conductive object detected in step 1715 or the device is not in hover mode, method 1700 may return to step 1701 and measure mutual capacitance again. If hover mode is active and there is at least one conductive object detected, each mutual capacitance sensor (unit cell or electrode intersection) may be compared to an exclusion region in step 1725. In one embodiment, the exclusion region may be defined by a level of capacitance change on each unit cell. If the mutual capacitance is change large enough, it may be determined to be within the exclusion region and the value of that unit cell not included, in one embodiment. In another embodiment, unit cells close enough to a peak unit cell may be determined to be within the exclusion region, meaning that the determination is spatial rather than based on signals. If a unit cell is determined to be within the exclusion region, its values may be withheld (excluded) from a common mode filter average in step 1730. If the unit cell is not within the exclusion region, a difference value may be calculated from the measured mutual capacitance value and a common mode filter baseline value in step 1740. If the difference value is greater than a threshold in step 1745, the raw capacitance measurement value may be added to a sum in step 1750. Step 1755 may ensure that all receive channels (e.g. channel 320 of FIG. 3B) have been analyzed and their values added to the sum if the unit cell is outside the exclusion region (step 1725) and the difference value greater than the threshold (step 1745). If all receive channels have been processed in step 1755, an average of the processed receive channels may be calculated in step 1760. In one embodiment, the average of the processed receive channels may be calculated from the summed difference values of step 1750 divided by the total number of difference values added to the sum. Note, the sum does not include values from unit cells within the exclusion zone (step 1725) or with difference values below the threshold (step 1745). After the average is calculated in step 1760, it may be subtracted from the raw capacitance values of all of the sensors in step 1780, regardless of whether they are outside the exclusion zone or if their difference value is greater than the threshold. The processed values from step 1780 may then be recorded in step 1630 of method 1600 and the remainder to method 1600 completed. In one embodiment, method 1700 may be completed by CPU 512 of FIG. 5. In various other embodiments, portions of method 1700 may be completed by a combination of CPU 512, tuning logic 513, and host 520 of FIG. 5.

Figure 17B:
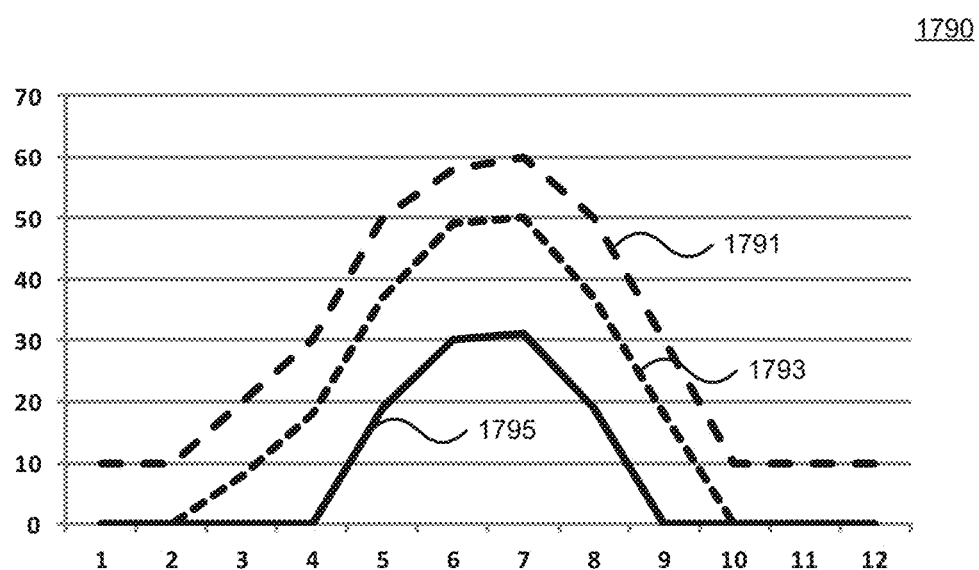
FIG. 17B illustrates hover data after applying a common mode filter, according to one embodiment.

FIG. 17B illustrates the result 1790 of the common mode filter on the mutual capacitance hover data. Line 1791 illustrates the recorded mutual capacitance data of step 1610 of methods 1600 and 1700. Line 1795 illustrates mutual capacitance data of step 1610 where all data for mutual capacitance at each unit cell is treated with the same subtraction. While the values of mutual capacitances of unit cells near the edge of the hover detection are zeroed out, there is a great amount of signal lost. Line 1793 illustrates mutual capacitance data of step 1780 with the common mode filter process complete. Noise at the edges of the hover detection is zeroed out, but a greater amount of signal is retained for calculation of hover position.

Figure 18B:
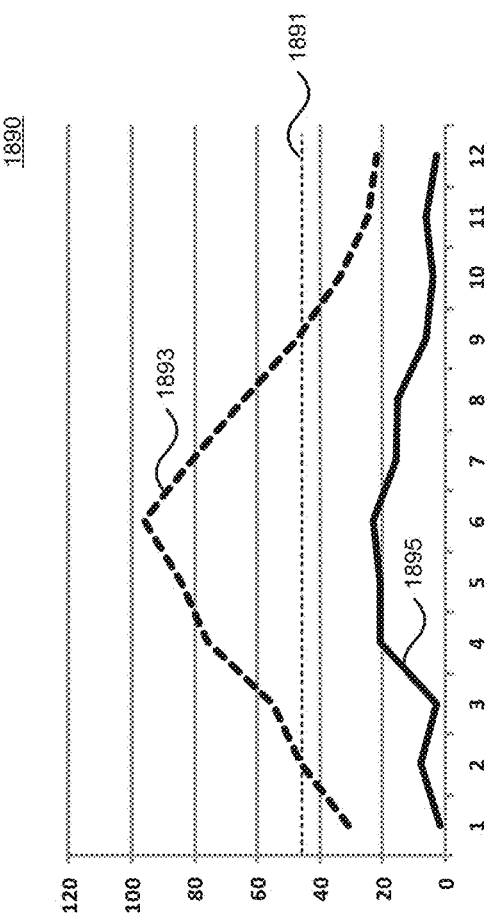
FIG. 18B illustrates self capacitance hover data as applied in the method of FIG. 18A, according to one embodiment.
Figure 18A:
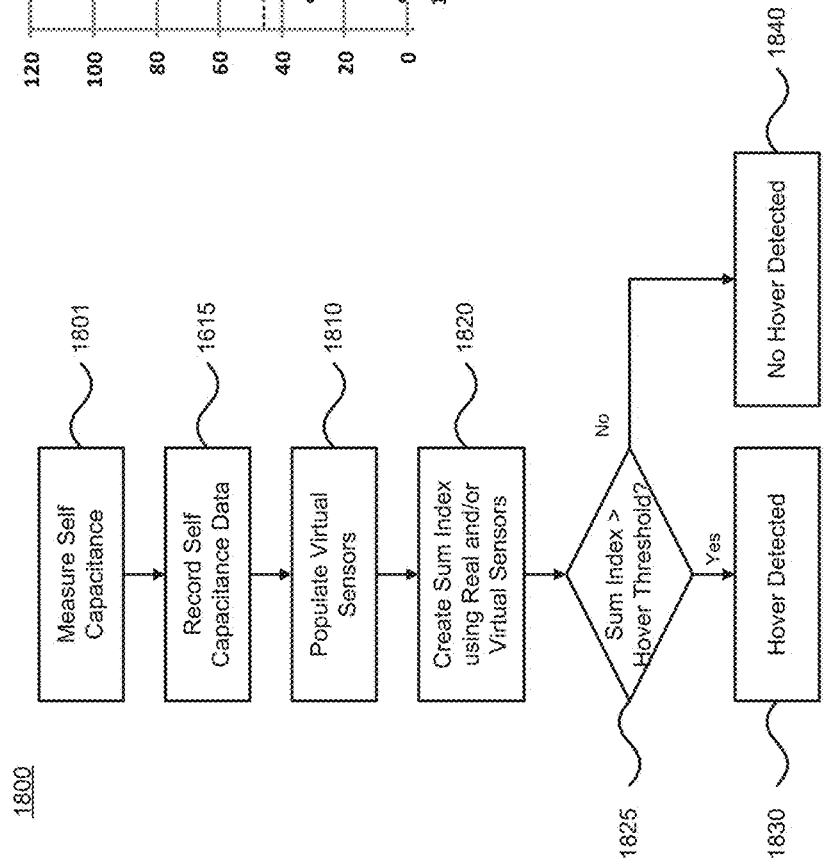
FIG. 18A illustrates a method for verifying hover detection with self capacitance measurement data, according to one embodiment.

FIG. 18A illustrates one embodiment of a method 1800 of the unit cell group processing of processing of step 1625 of method 1600. Self capacitance may be first measured in step 1801, similar to the capacitance measurement of step 1601 of method 1600 and with a circuit similar to that of FIG. 3A. After the self capacitance data is recorded in step 1615, method 1800 may populate a plurality of virtual unit cells with values derived from the measured self capacitance values of real unit cells. Virtual unit cells may correspond to locations on the array just outside the physical area covered by the electrodes and corresponding to unit cells as shown in FIG. 2A-B and FIGS. 10A-D. Virtual unit cells may not be part of the array of unit cells, but rather created in firmware to represent unit cells beyond the physical limits of the array of unit cells. In one embodiment, virtual unit cells may be populated according to Table 1.

TABLE 1

| $S_{-2} = S_1 - S_0$ | $S_{-1} = 2(S_1 - S_0)$ | $S_0$ | $S_1$ | $S_2$ | $S_3$ |
|---|---|---|---|---|---|

One of ordinary skill in the art would understand that Table 1 is representative on one side of an array of self capacitance sensors and that a similar table may be used for the other side of the array of self capacitance sensors. An example is shown in Table 2.

TABLE 2

| $S_{N-3}$ | $S_{N-2}$ | $S_{N-1}$ | $S_N$ | $S_{N+1} = 2(S_{N-1} - S_N)$ | $S_{-2} = S_{N-1} - S_N$ |
|---|---|---|---|---|---|

While Tables 1 and 2 show the same equations used for both the right and left of the array, one of ordinary skill in the art would understand that other calculations may be used to derive values for virtual unit cells. Additionally, while only two basic equations are shown and applied to specific unit cells, various other equations may be used and may differ based on the position of the virtual unit cell relative to the rest of the array of unit cells, the axis of the virtual unit cell or the axis under test, measured capacitance values for the various unit cells, including a peak unit cell, or the mode of operation of a device or touchscreen controller. Virtual unit cell and real unit cell data may be summed in step 1820 to create a new value for each real unit cell in the self capacitance array. In one embodiment, five unit cells in a 1×5 matrix, centered on each unit cell, may be summed together. In various embodiments, different combinations of unit cells (more or less than five) may be used. Changing the number of unit cells may require a different number of virtual unit cells. In still other embodiments, additional processing may be applied to the unit cell information, including but not limited to multiplying or dividing values by various coefficients. The sum index from step 1820 may be compared to a hover threshold in step 1825 and if the sum index is greater than the hover threshold, a hover detected and the position from step 1640 of method 1600 reported to the host in step 1661. If the sum index is not greater than the hover threshold, the hover position calculated in step 1640 may not be reported to the host in step 1661. In one embodiment, method 1800 may be completed by CPU 512 of FIG. 5. In various other embodiments, portions of method 1800 may be completed by a combination of CPU 512, tuning logic 513, and host 520 of FIG. 5.

FIG. 18B illustrates the result 1890 of the sum index and hover threshold comparison of method 1800. The values of lines 1895 (raw capacitance data from step 1615) and 1893 (processed capacitance data from step 1614 and 1820) are compared to the hover threshold 1891. If the raw values are less than the threshold and the processed values are greater than the threshold, a valid hover is detected in step 1655.

Once a valid hover is detected, the next step may be to determine the position of that hover on the array.

FIG. 19A illustrates an array 1901 of mutual capacitance unit cells with capacitance changes similar to those shown in FIG. 10C. Peak unit cell 1910 is identified using the 5×5 matrix of unit cells as illustrated in FIG. 10C and described in FIG. 11A. FIG. 19A illustrates the calculation of an EdgeCutoff that may be used to determine which unit cells are used to calculate the position of a hover over the array 1901 of mutual capacitance unit cells. Because of noise at the edges of a hover, there may exist jitter on the position calculation of a hover that creates imprecision in the position reported to the host and viewed by the user. Determining which unit cells are used in calculating the position by setting a threshold that is derived, in part, from the measured capacitance changes may improve performance and the user experience. After peak unit cell 1910 is identified, the center three 1×5 matrices of cells about the peak may be summed. In the example in FIG. 19, the row with peak unit cell 1910 is summed to equal 84 (14+21+23+16+10) and the rows immediately above and below peak unit cell 1910 are summed to equal 97 and 94, respectively. The column with peak unit cell 1910 is summed to equal 106 (15+24+23+23+21) and the columns immediate to the left and right of peak unit cell 1910 are summed to equal 94 and 82, respectively. The three rows and three columns about peak unit cell 1910 may then be summed to yield a row sum of 275 and a column sum of 282. These sums may be multiplied by a scalar to yield an EdgeCutoff value. In the example in FIG. 19, the scalar is 10/54, which yields an EdgeCutoff for rows of 51 and an EdgeCutoff for columns of 52. Using these EdgeCutoffs, rows and columns are included or not included based on their 1×5 matrix sum about peak unit cell 1910. While a 1×5 matrix is shown in FIG. 19, one of ordinary skill in the art would understand that in various embodiments, different shapes and sizes of matrices may be used. For example 1×3, 1×4, or even 1×87 matrices may be used. The size of the matrix may be set during development in one embodiment. In another embodiment, the size of the matrix may be set based on the unit cell or column or row under test, the signal level of a peak unit cell, or a mode of operation of the device or touchscreen controller.

In the example of FIG. 19A, there are six columns with values above the EdgeCutoff and six rows with values above the EdgeCutoff. These six rows and six columns may be used in calculating the position of the hover. The scalar of 10/54 may be determined in development and design of the touchscreen in one embodiment. In another embodiment, there may be multiple values stored in the device, either in the touchscreen controller or in the host, that may be used based on varied capacitance change values or user settings. In one embodiment, a user may be able to increase or decrease the scalar by entering a settings window and adjusting the sensitivity of the hover detection and the accuracy of the position, relative to other touch parameters. For example, decreasing the EdgeCutoff may provide greater range in calculation of hover position, but may also introduce more jitter into the position calculation. If a user values sensitivity over precision, they may chose to decrease the value of the scalar.

FIG. 19B illustrates an embodiment of the EdgeCutoff and how it may be applied to the summed values in determining which rows are used in calculation of the position of the hover and how much of each column and row are used. While FIG. 19A illustrates only the calculation of position along rows, one of ordinary skill in the art would understand that that a similar method and calculation may be used for columns. Each row with values above the EdgeCutoff 1930 is shown as a histogram with the value at the top. Rows 2 and 9 are below EdgeCutoff 1930 and are therefore not used in the calculation of the hover position. Rows 3 and 8 are above EdgeCutoff 1930, but they are the first rows on each side of peak unit cell 1910 that are included and their contributions may therefore be discounted. Because row 3 is barely above EdgeCutoff 1930 and row 2 is so far below EdgeCutoff 1930, only one third (18 of 54) of the value of row 3 may be included in the position calculation. Because row 8 may be higher above EdgeCutoff 1930 and because row 9 is closer to EdgeCutoff 1930, more of row 8 is included in the position calculation (86%; 59 of 69).

Because a hovering object may exert less influence over measured capacitance levels of an array of capacitance sensing electrodes, hover detection may be susceptible to false detections or rapidly changing positions due to proximity of other objects near or on the array of capacitance sensing electrodes. In various embodiments, to maintain a position, some level of hysteresis may be used.

Figure 20:
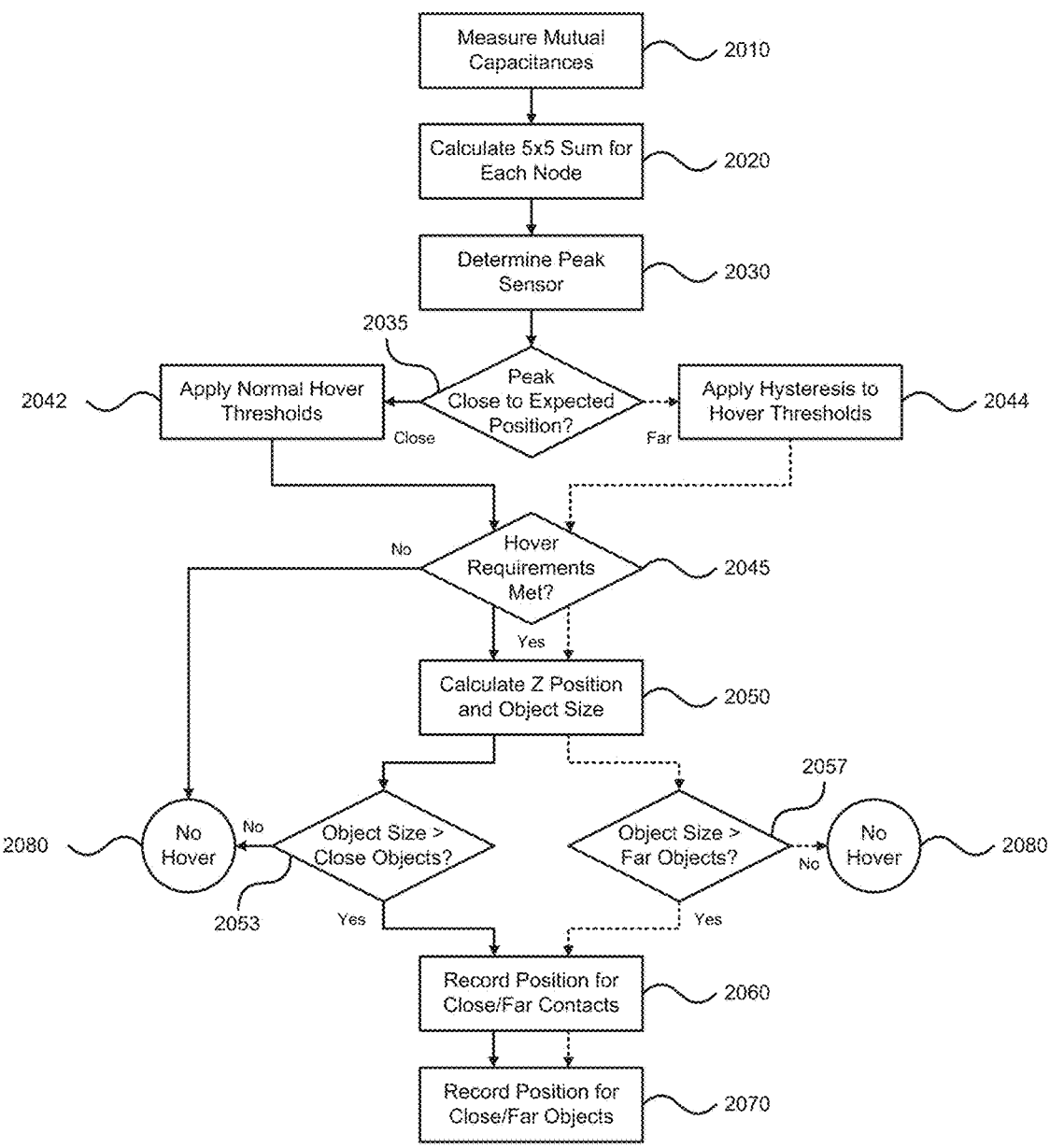
FIG. 20 illustrates a method for determining hover location and distance for hover detections, according to one embodiment.

FIG. 20 illustrates a method 2000 for maintaining position of hover in the presence of other signals (such as another hover or a grip) or high noise. Method 2000 may be used to ensure that a hover detection is made and tracked over the screen as a user's hand gets closer to the array of electrodes or if a user's fingers holding the device begin to change the capacitance of electrodes along the edge of the array of electrodes. Mutual capacitances for each unit cell may be measured in step 2010 and the sum of each unit cell and the 24 unit cells in a 5×5 matrix about that unit cell is calculated in step 2010. This may be similar to that described with regard to FIG. 10C. After each unit cell has a calculated sum, a peak sensor (or sensors) is identified in step 2030, for example as shown and described in FIGS. 10 11, and 12. Using a previously identified peak unit cell, the presently identified peak unit cell may be compared to see if it is close to or far from the previous peak. If the presently identified peak unit cell is close to the previous peak unit cell, a normal hover threshold may be applied in step 2042. In various embodiments, this may mean that normal scalars are used (see EdgeCutoff from FIGS. 19A and 19B) or it may mean that values of capacitance changes necessary to detect that a hover is even present are maintained. If the presently identified peak unit cell is far from the previous peak a hysteresis may be applied to the various hover thresholds in step 2044. In various embodiments, scalars may be increased for the EdgeCutoff, or the values of capacitances necessary to detect that a hover is present may be raised. With the hover thresholds set in steps 2042 and 2044, the capacitance values may be analyzed to detect a hover in step 2045. If the hover requirements are not met in step 2045, method 2000 may return to step 2010 and measure the mutual capacitances again. If the hover requirements are met in step 2045, the height (Z position) of the object above the array and the object size may be calculated in step 2050. For close peaks identified in step 2035, the object size from step 2050 may be compared to a threshold for close objects in step 2053. If the object size from 2050 is greater than the threshold for close objects in step 2053, the position of the object may be calculated in step 2060 and recorded in step 2070. If the object size from 2050 is not greater than the threshold for close objects in step 2053, method 2000 may return a state of "no hover" in step 2080 and may return to step 2010 and measure mutual capacitances again. For far peaks identified in step 2035, the object size from step 2050 may be compared to a threshold for far objects in step 2057. If the object size from 2050 is greater than the threshold for far objects in step 2057, the position of the object may be calculated in step 2060 and recorded in step 2070. If the object size from 2050 is not greater than the threshold for far objects in step 2057, method 2000 may return a state of "no hover" in step 2080 and may return to step 2010 and measure mutual capacitances again.

Method 2000 of FIG. 20 may be used to ignore extraneous or unintended interaction with the array that may register as a hover by using expected values to increase or decrease the criteria for detecting a hover. For a hover detection that is close to the expected position, the thresholds for qualifying a hover may be relaxed compared to the qualifications if a hover detection that is farther from the expected position. This means that a hover that is moving rapidly high above the array is more likely to be dropped than a finger at the same height that moves more slowly.

Figure 21:
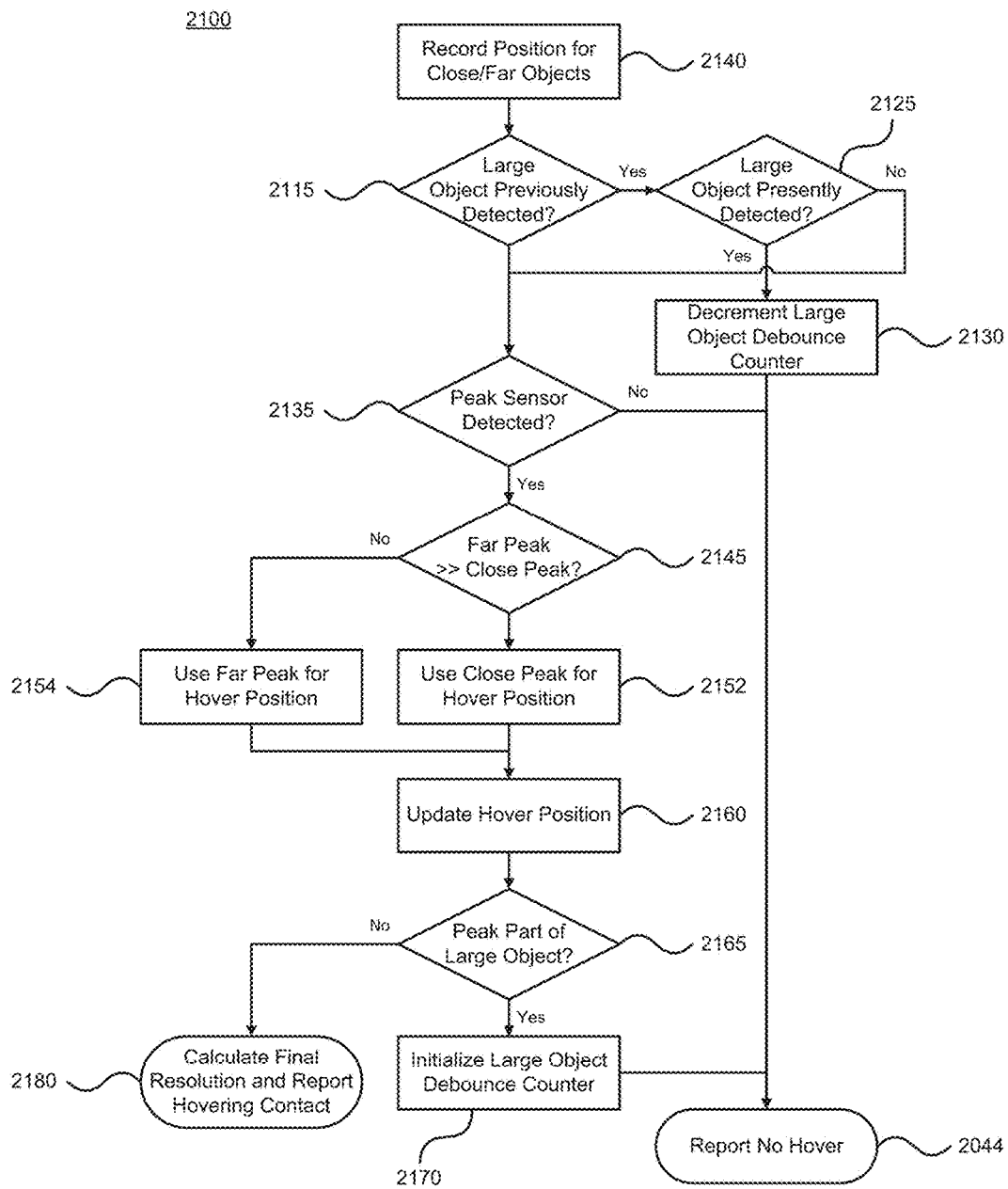
FIG. 21 illustrates a method for distinguishing and processing a hover from a large object, according to one embodiment.

FIG. 21 illustrates addition steps in method 2100 for determining which peak unit cell to use in detecting or maintaining a hover, as well as calculating the hover position. Method 2100 may begin by recording positions for close and far objects in step 2110, similar to step 2070 of FIG. 20. If a large object was previously detected in step 2115, method 2100 may then determine if a large object is presently detected in step 2125. If a large object is presently detected in step 2125, a large object debounce counter may be decremented in step 2130 and a hover not reported in step 2190. If a large object was not previously detected in step 2115 or a large object is not detected in step 2125, a peak unit cell may be detected in step 2135. If a peak unit cell is not detected, a hover is not reported in step 2190. If a peak unit cell is detected in step 2135, and the far peak unit cell is much higher than the close peak, the far peak is used for hover position calculation in step 2154. If the far peak unit cell is not much higher than the close peak unit cell, the close peak unit cell is used for hover position calculation in step 2152. Hover position may be updated based on the identified peak unit cells from steps 2152 and 2154 in step 2160. If the peak unit cell is not part of a large object in step 2165, the final position is calculated and a hover contact is report to the host in step 2180. If the peak unit cell is part of a large touch, a large object debounce counter may be initialized in step 2170 and a hover not reported in step 2190.

Once a hover has been detected and verified the position of that hover may be calculated using standard centroid calculation methods, such as Equation (3). However, the low signal level of a hover may cause significant jitter in the detected position and reduce the usability of a touchscreen device with hover capability enabled. As a result, different position calculation algorithms may be used to for hovering contact types than for objects and contact types with greater capacitive influence on the measured capacitance data of the various capacitance sensing electrodes and measurement circuitry.

FIG. 22A illustrates an embodiment of a method 2201 for calculating the position of a hover contact on an array of electrodes using a median unit cell and the pitch of the electrodes of the array. All unit cells used in calculation of position may be summed in step 2210. In one embodiment, the unit cells used for hover position calculation are determined using the method outlined with regard to FIGS. 19A and 19B. In another embodiment, a straight usage of a matrix of unit cells around a peak as shown in FIGS. 10B-C and 11 may be used. In various other embodiments, all unit cells in the array or other subsets of unit cells may be use. After all of the signals from all relevant unit cells are summed in step 2210, the sum my then be divided by 2 in step 2220. Starting with the first unit cell in the array to be used in position calculation, values on each unit cell are added together in step 2230. The value of a first unit cell, $S_N$, may be added to the value of a second unit cell, $S_{N+1}$. The value of $S_N$ and $S_{N+1}$ may then be recorded as a total, $S_{TOTAL}$ in step 2240. The value of $S_{TOTAL}$ may then be compared to the sum of all unit cells divided by 2 from step 2220 in step 2245. If $S_{TOTAL}$ is less than half of the sum of all unit cells, the signal from the next unit cell may be added to $S_{TOTAL}$ in step 2250 and the comparison of step 2245 may be repeated. If $S_{TOTAL}$ is greater than half of the sum of all unit cells, a ratio, R, may be calculated by subtracting half of the sum of all unit cells from $S_{TOTAL}$ and dividing that value by the value of the unit cell, $S_{HALF}$, that cause $S_{TOTAL}$ to pass the value of half of the sum of all unit cells in step 2260. Position may then be calculated as the ratio, R, times the unit cell pitch plus the number of previous unit cells times the unit cell pitch in step 2270. Dividing the sum of all relevant unit cells by two is not intended to be limiting. In some embodiments, different values may be used in the denominator, including whole numbers or fractions. In still other embodiments, the sum of all relevant unit cells may be divided into more than two groups to provide different ranges or possibilities of identified unit cells FIG. 22B illustrates an example of method 2201 of FIG. 22A. The position using a standard centroid calculation is shown as centroid position 2280. However, this position may be unnecessarily effected by the sensor values at the right edge of the contact. By using method 2201 of FIG. 22A, the median position 2282 is shown to be slightly left of the centroid position 2280. In the example shown in FIG. 22B, $S_{TOTAL}$ is 270, which means that the position is calculated as 28.125% across sensor 3. If standard centroid calculation is used, the position is calculated as 44.34%, according to equation (3).

FIGS. 23A, 23B, and 23C illustrate various embodiments of ratios of values on unit cells for different contact types near the edge of an array of capacitance sensing electrodes. These ratios may be used to differentiate between the different contacts and apply different position calculation and other processing algorithms to the capacitance information. The sensors used in calculation may be determined similarly to those shown in FIGS. 19A and 19B.

FIG. 23A illustrates a grip contact on the edge of an array. A peak unit cell may be identified and a pair of 1×5 matrices about that peak unit cell summed. The ratio of the outer most matrix to the more centered matrix may then be calculated and recorded. For the grip contact of FIG. 23A, the sum of the 1×5 matrix at the edge of the array is 236 and the sum of the more centered 1×5 matrix is 64, yielding a ratio of 3.7.

FIG. 23B illustrates a hover contact over the edge of an array. A peak unit cell may be identified and a pair of 1×5 matrices about that peak unit cell summed as described in with regard to FIG. 23A. The ratio of the outer most matrix to the more centered matrix may then be calculated and recorded. For the hover contact over the edge of an array of FIG. 23B, the sum of the 1×5 matrix at the edge of the array is 68 and the sum of the more centered 1×5 matrix is 45, yielding a ratio of 1.5

FIG. 23C illustrates a hover contact near the edge of an array, but not over it. A peak unit cell may be identified and a pair of 1×5 matrices about that peak unit cell summed as described in with regard to FIGS. 23A and 23B. The ratio of the outer most matrix to the more centered matrix may then be calculated and recorded. For the hover contact near the edge of an array of FIG. 23C, the sum of the 1×5 matrix at the edge of the array is 124 and the sum of the more centered 1×5 matrix is 111, yielding a ratio of 1.1.

The matrices of FIGS. 23A, 23B, and 23C, while illustrated as 1×5 matrices, may have different dimensions and shapes. In another embodiment, the matrices may be determined during the manufacturing process for each touchscreen unit and burned into the controller at production. In still another embodiment, the matrices may be changed or turned by the user through a settings menu and interface. In some embodiments a user may not change the dimensions and shapes of the matrices directly. Rather settings on sensitivity or response may change a variety of parameters, of which the matrix shape may be one.

The various ratios of FIGS. 23A, 23B, and 23C may be compared to expected values and if they are in certain ranges, the contacts correctly identified and processed accordingly. In one embodiment, the ranges may be determined during development and burned into the controller during production. In another embodiment, the ranges may be determined during the manufacturing process for each touchscreen unit and burned into the controller at production. In still another embodiment, the ratios may be changed or otherwise altered by the user through a settings menu and interface. In some embodiments a user may not change the ratio thresholds directly. Rather settings on sensitivity or response may change a variety of parameters, of which the ratio thresholds may be one.

Furthermore, while FIGS. 23A, 23B, and 23C show detection of objects on vertical edges of an array of unit cells, one of ordinary skill in the art would understand that the same or similar scheme may be used along horizontal edges of an array of unit cells.

Figure 24:
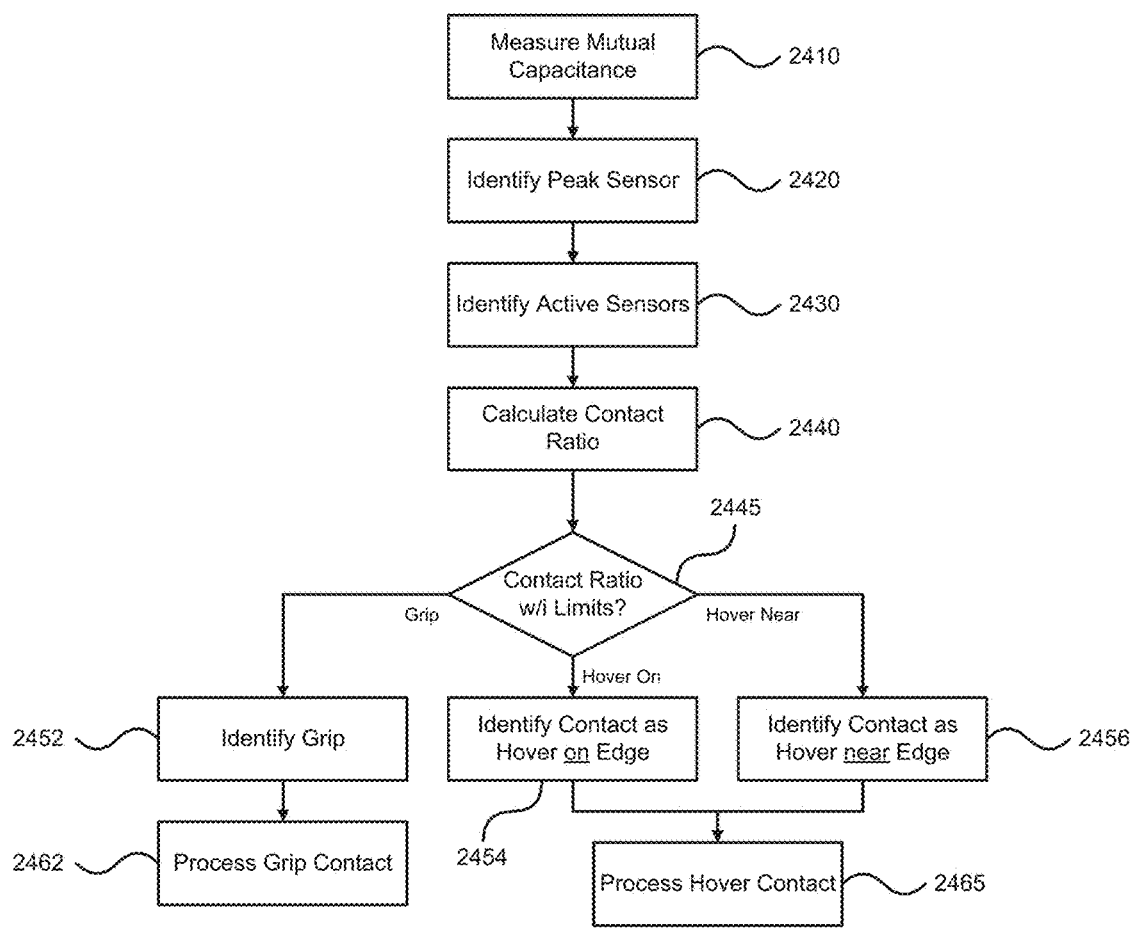
FIG. 24 illustrates a method for calculating and using a ratio of measurements to identify and process various types of contacts, according to one embodiment.

FIG. 24 illustrates one embodiment of a method 2400 for determining what type of contact is present according the embodiments in FIGS. 23A, 23B, and 23C. Mutual capacitance may be first measured in step 2410. In one embodiment, mutual capacitance may be measured according to the circuit illustrated in FIG. 3B. In one embodiment, the measured mutual capacitance may be represented as the difference between a measured value and a baseline value that is maintained for each unit cell or globally for the array. A peak unit cell may then be identified in step 2420. The peak unit cell of step 2420 may be identified in a manner similar to that shown in FIGS. 10B and 10C, as well as FIGS. 11A and 11B. After the peak unit cell is identified in step 2420, active unit cells may be identified in step 2430 in a manner similar to that shown in FIG. 19A. The contact ratio of the active unit cells as illustrated in FIG. 23 may be calculate in step 2440. In one embodiment, the contact ratio of step 2440 may be calculated as the sum of a first 1×5 matrix about a peak unit cell at the edge of the array divided by a second 1×5 matrix about a peak unit cell one column or row more central than the first 1×5 matrix. While the embodiment shown in FIG. 23 illustrates only a pair of 1×5 matrices, one of ordinary skill in the art would understand that matrixes of greater length and width may be used. Additionally, while the embodiments of FIGS. 23 and 24 divide the outer most matrix by the adjacent matrix, one of ordinary skill in the art would understand that this may be reversed than that the inverse of the ratios uses in the same manner. Once the contact ratio is calculated in step 2440, it may be compared to a number of ranges in step 2445. If the ratio of step 2440 is within a "grip" range, a grip contact may be identified in step 2452 and processed with grip heuristics in step 2462. If the ratio of step 2440 is within a "hover on" range, a hover on the edge of the array may be identified in step 2454 and processed with the appropriate hover heuristics in step 2465. If the ratio of step 2440 is within a "near hover" range, a hover near the edge of the array may be identified in step 2456 and processed with the appropriate hover heuristics in step 2465.

Figure 25A:
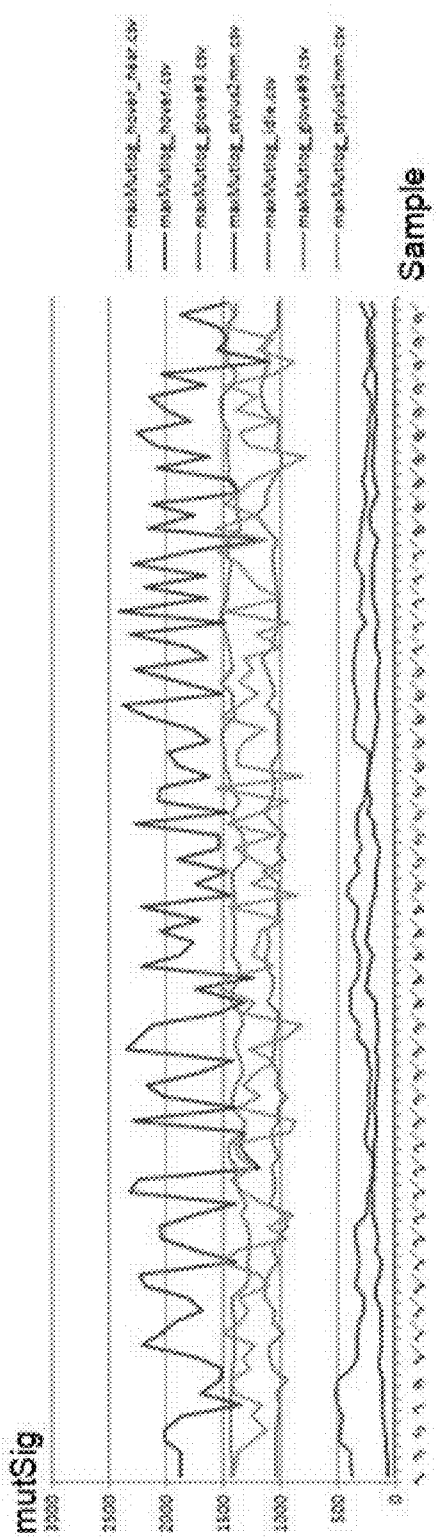
FIG. 25A illustrates maximum values of various contact types on an array of unit cells, according to one embodiment.

FIG. 25A illustrates the maximum signals detected for various touch types, including hover, hover near an edge, a thin glove, a 2 mm stylus, no touch, a thick glove and a 1 mm stylus. These maximum signals may be used to define partitions or ranges with the regions of FIG. 26. If there is touch or hover detected, the received signals may represented a noise floor, from which difference values may be calculated and processed to detect the various object and contact types.

Figure 25B:
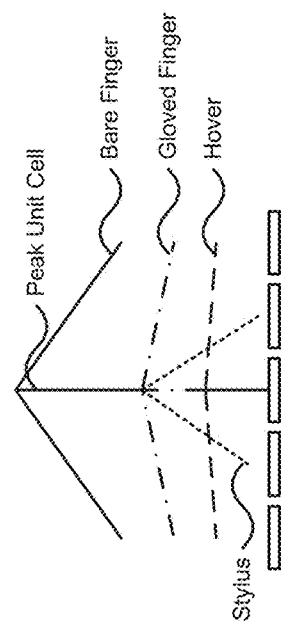
FIG. 25B illustrates ratios of peaks to 5×5 sum values of various object and contact types, according to one embodiment.

FIG. 25B illustrates the relationship between the value of a peak unit cell and the surrounding unit cells for the various object and contact types. A typical finger has a high peak unit cell value and falls off from there at a rate that is below a stylus, but above a gloved finger or hover. A gloved finger and a stylus have similar peak unit cells values, but the lower contact area of a stylus results in a much steeper drop off of signal from unit cells surrounding the peak unit cell. A hover and a stylus may have different peak unit cell values, but integrating the value of the peak unit cell and the surrounding unit cell, may result in similar values.

Figure 26:
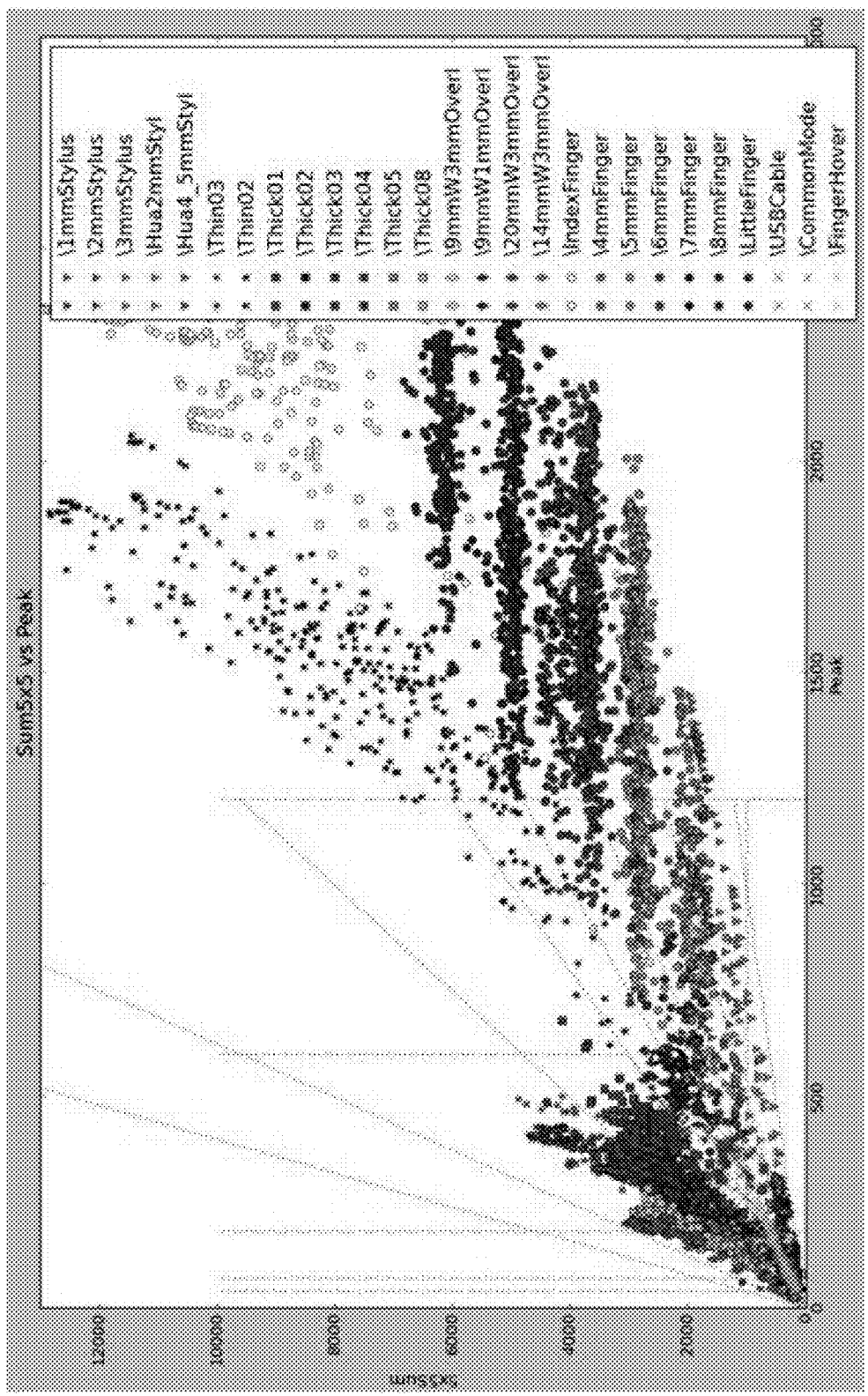
FIG. 26 illustrates peak values and 5×5 sum values plotted to show mode partitions, according to one embodiment.

FIG. 26 illustrates a chart with various 5×5 sums of sensors similar as those illustrated in FIGS. 10B and 10D on the Y-axis and the peak sensor value on the X-axis to show that various touch types have peak values and sums that correspond to specific regions and may be categorized when a touch controller is in various touch modes.

Figure 27A:
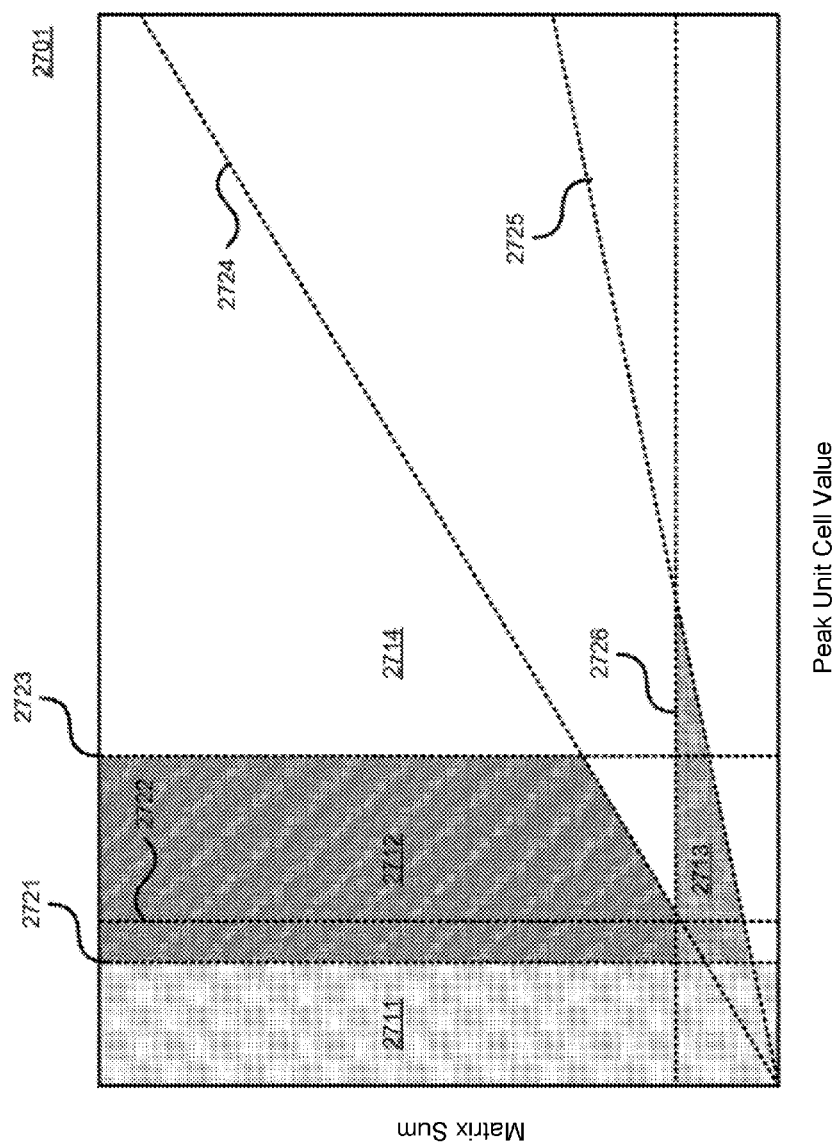
FIG. 27A illustrates a plurality of partitions for a device operating in finger mode, according to one embodiment.
Figure 27B:
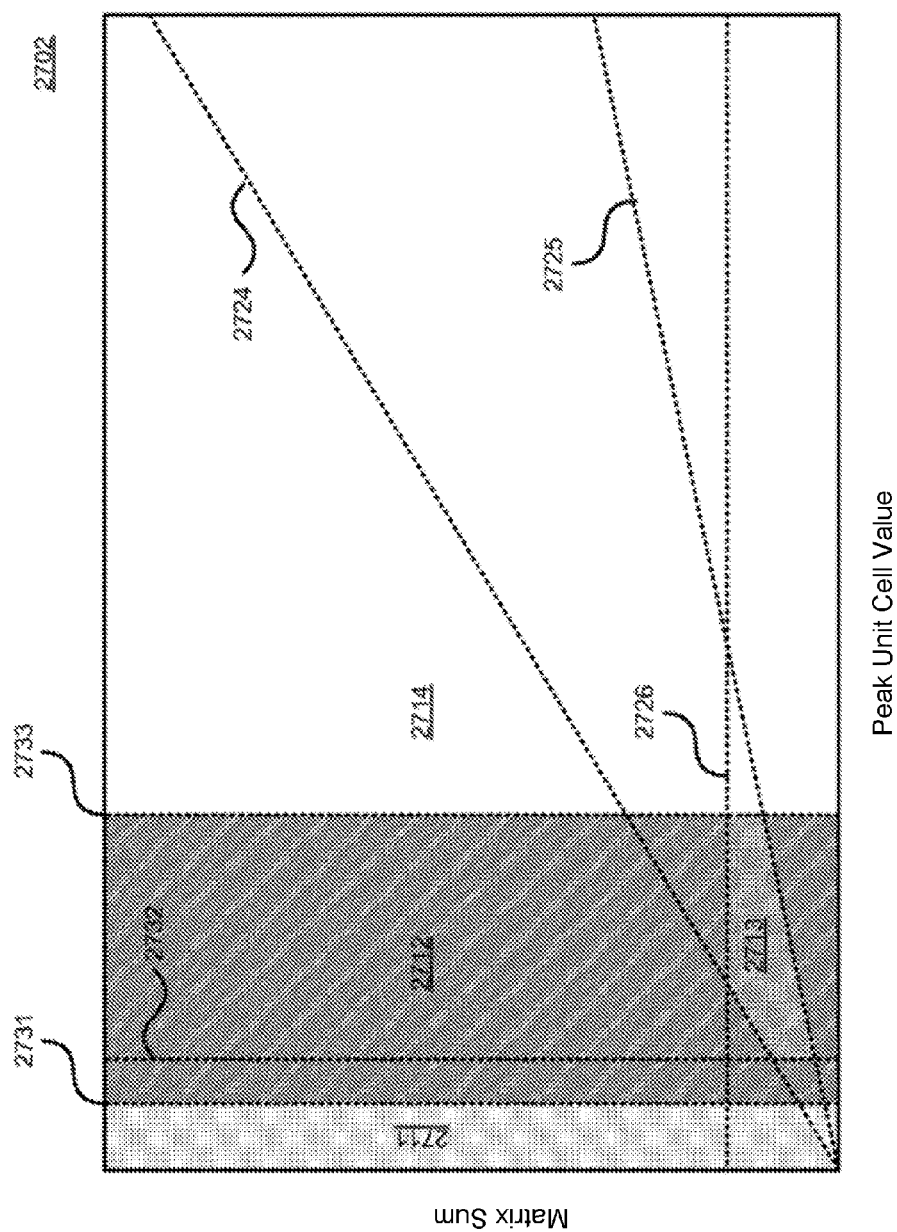
FIG. 27B illustrates a plurality of partitions for a device operating in glove mode, according to one embodiment.
Figure 27C:
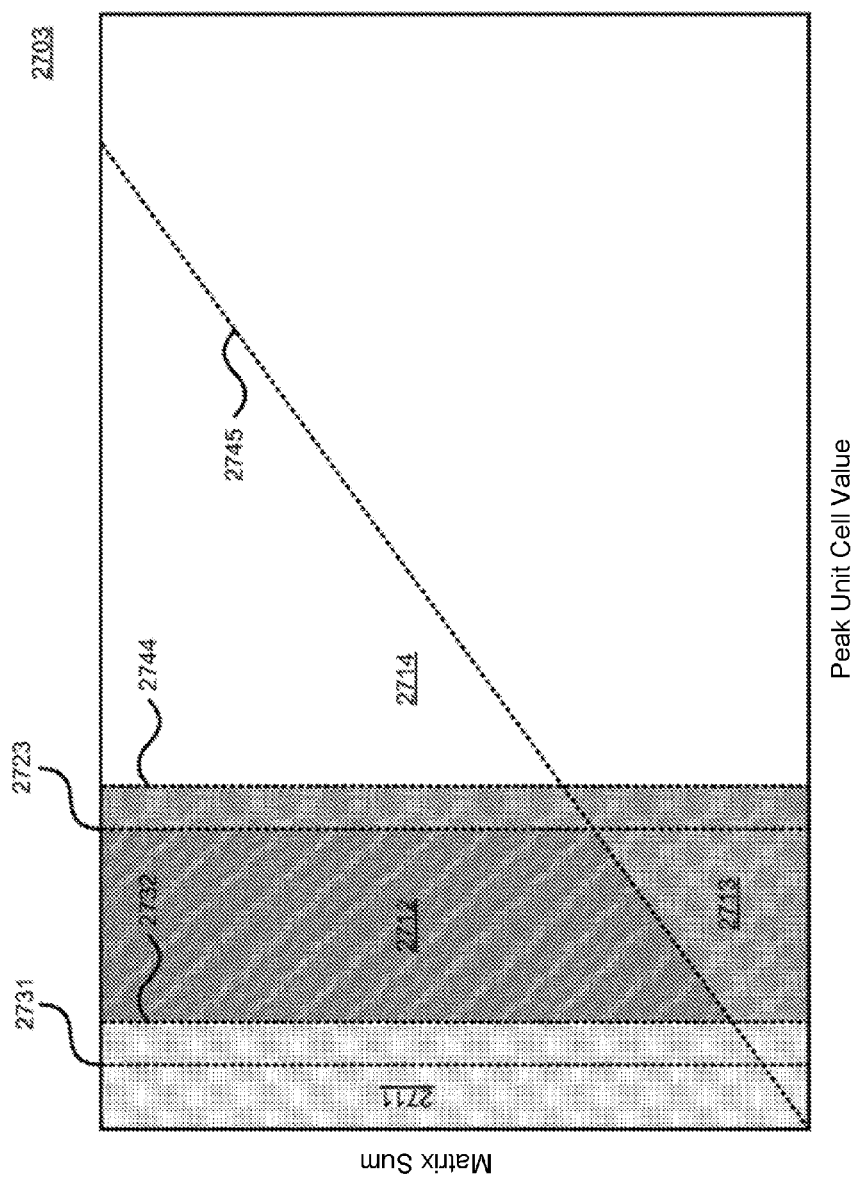
FIG. 27C illustrates a plurality of partitions for a device operating in stylus mode, according to one embodiment.

FIGS. 27A, 27B, and 27C illustrate various partitions or ranges for detecting a contact type when operating in various modes. The 5×5 matrix sum about a peak unit cell is calculated similar as those illustrated in FIGS. 10B and 10D and plotted on the Y axis. The peak unit cell value is plotted on the X axis. Where the point lies within the various partitions is used to identify the contact type. For FIGS. 27A, 27B, and 27C, there are four possible partitions: idle/hover 2711, gloved finger 2712, stylus 2713, and bare finger 2714. If partition 2711 is active, the various methods for identifying and calculating the position of a hover of the preceeding figures may be used.

FIG. 27A illustrates a plot 2701 of partitions or ranges for a touchscreen device operating in finger mode. In one embodiment, all peak unit cells with values less than a value of a first touch threshold 2721 are identified as "idle" or corresponding to no contact in direct contact the array. In one embodiment, peak unit cells and the values of each may be determined and calculated according to FIGS. 10, 11, and 12. For peak unit cell values greater than the first touch threshold 2721 and less than a maximum glove peak 2723, which is representative of the highest peak value for which a gloved finer may be detected, with 5×5 sums (as illustrated in FIGS. 10B and 10D) that are greater than the peak unit cell value multiplied by a value to create a matrix threshold 2724 are identified as a gloved finger. For peak values greater than the first touch threshold 2721 with 5×5 sums that are less than the peak unit cell value multiplied by a value to create a matrix threshold 2726 and greater than the peak 2125 are identified as a stylus. All other points are identified as a bare finger directly on the array.

FIG. 27B illustrates a plot 2702 of partitions or ranges for a touchscreen device operating in glove mode. In one embodiment, all peak unit values less than a value of a minimum value that can be used to identify a gloved finger 2731 are identified as "idle" or corresponding to no contact in direct contact the array. In one embodiment, peak unit cells and the values of each may be determined and calculated according to FIGS. 10, 11, and 12. For peak values greater than the minimum value that can be used to identify a gloved finger 2731 and less than the maximum signal that can be used to identify a gloved finger 2733 with 5×5 sums (as illustrated in FIGS. 10B and 10D) that are not with a partition bounded by the value of the peak along the Y axis (line 2726), the maximum value of a 5×5 matrix that can be detected as a stylus 2726 and peak unit cell values bounded by matrix threshold 2724 and stylus threshold 2732, a gloved finger is identified. For peak values greater than the stylus threshold 2732 with 5×5 sums less than the maximum value of a 5×5 matrix that can be detected as a stylus 2726 and greater than peak on the Y axis 2125 are identified as a stylus. All other points are identified as an uncovered finger directly on the array. For points within a partition bounded by the peak on the Y axis 2726, the maximum value of a 5×5 matrix that can be detected as a stylus 2726 and peak values bounded by matrix threshold 2724 and stylus threshold 2732, a stylus is identified. All other points are identified as a bare finger directly on the array.

FIG. 27C illustrates a plot 2703 of partitions or ranges for a touchscreen device operating in stylus mode or hover mode. In one embodiment, all peak values less than a value of stylus threshold 2732 are identified as "idle" or corresponding to no contact in direct contact the array. In one embodiment, peak unit cells and the values of each may be determined and calculated according to FIGS. 10, 11, and 12. For peak values greater than stylus threshold 2732 and less than maximum glove peak 2723 with 5×5 sums (as illustrated in FIGS. 10B and 10D) that are greater than an increased peak value 2745 are identified as a gloved finger. For peak values greater than stylus threshold 2732 with 5×5 sums less than peak value 2745 or peak values greater than maximum glove peak 2723 and less than a boundary between stylus and bare fingers 2744 greater are identified as a stylus. All other points are identified as a bare finger directly on the array.

Figure 28:
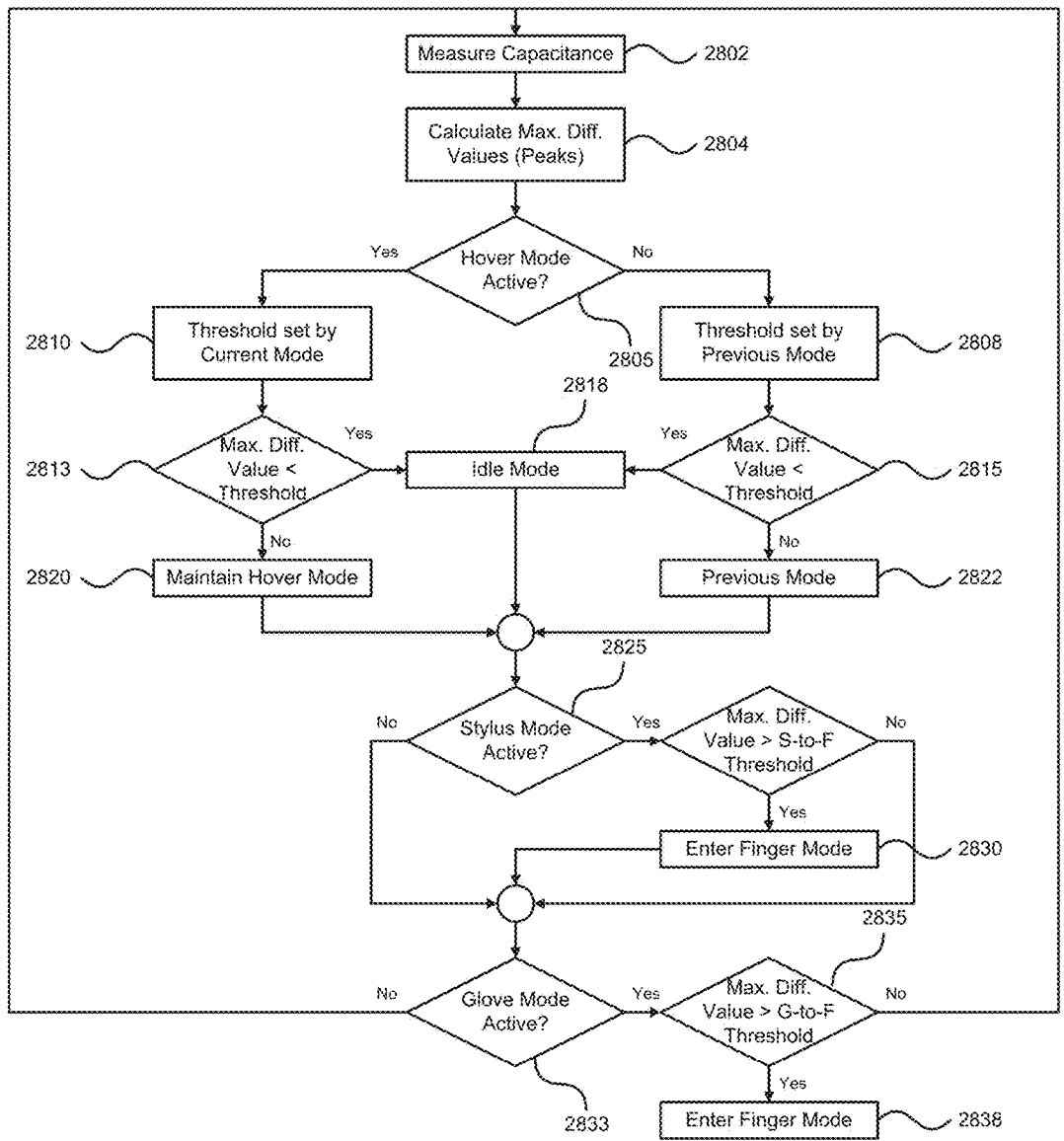
FIG. 28 illustrates a method for determining the correct mode of a touchscreen device, according to one embodiment.

FIG. 28 illustrates a method 2800 for determining the correct mode of a touchscreen based on the maximum signal (value of a peak unit cell) and a number of thresholds, according to one embodiment. Capacitance of each intersection may be measured in step 2802 and maximum difference values calculated in step 2804. If hover mode is active in step 2805, a threshold is set by the hover mode settings in step 2810 and the maximum difference value from step 2804 is compared to that threshold in step 2813. If the maximum difference value is less than the threshold, no contact is detected and the touchscreen enters an idle mode in step 2818. If the maximum difference value exceeds the threshold, hover mode is maintained in step 2820. If hover mode is not active in step 2805, the threshold is set by whatever the previous mode was in step 2808. The maximum difference value is compared to the threshold from the previous mode in step 2815 and, if it is less than the threshold, no contact is detected and the touchscreen enters an idle mode in step 2818. If it is greater than the threshold from the previous mode, the device transitions from hover mode to whatever the previous mode was in step 2822. If stylus mode is active in step 2825, the maximum difference value from step 2804 is compared to a threshold for a transition from stylus detection to finger detection in step 2827 and if the maximum difference values are greater than that threshold, the touchscreen device enters finger mode in step 2830. If glove mode is active in step 2833, the maximum difference value from step 2804 is compared to a threshold for a transition from glove detection to finger detection in step 2835 and if the maximum difference values are greater than that threshold, the touchscreen device enters finger mode in step 2838. If it does not, the previous mode is entered and the appropriate thresholds for that mode are used.

Figure 29:
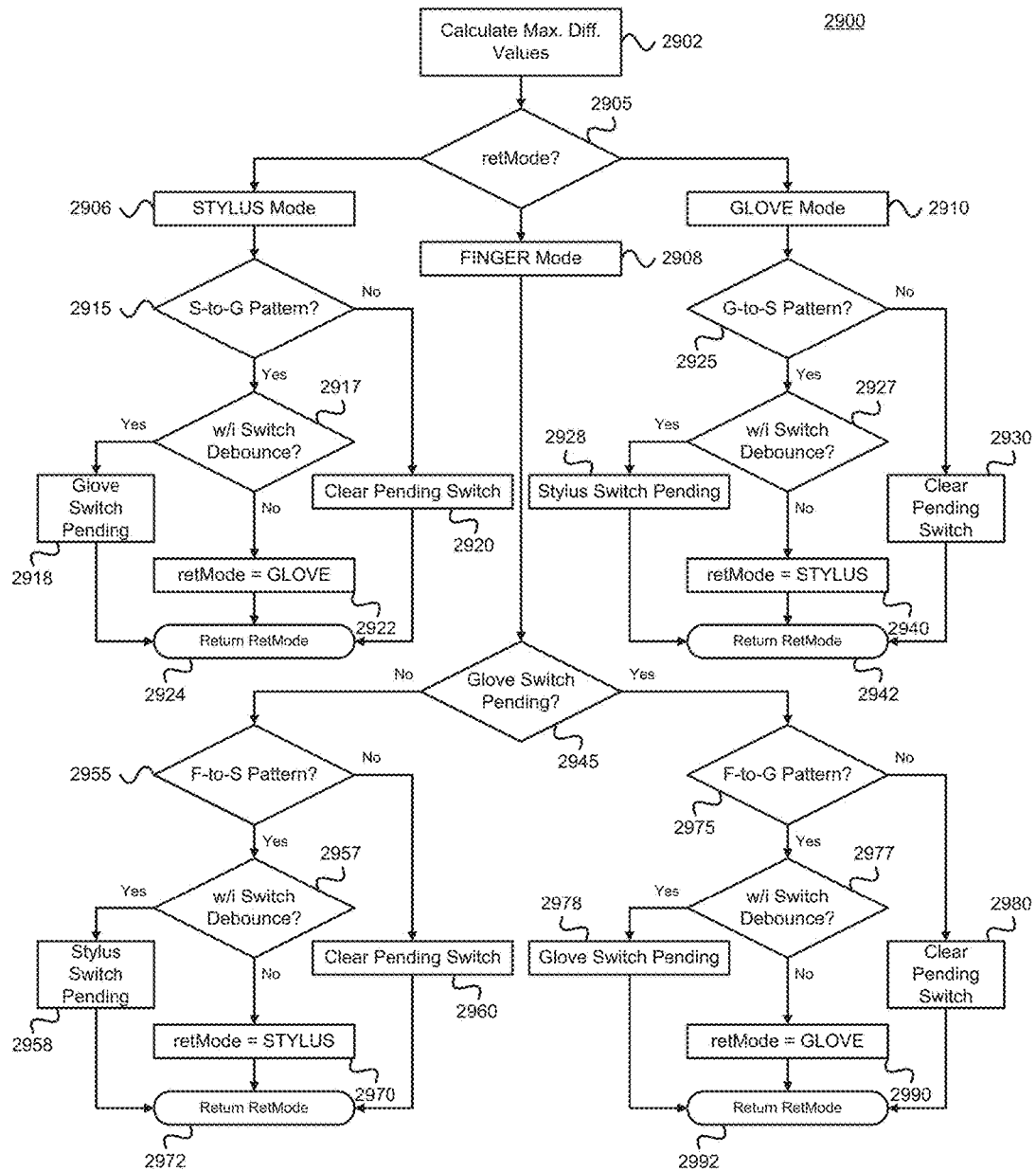
FIG. 29 illustrates a process for determining the correct mode of a touchscreen device, according to another embodiment.

FIG. 29 illustrates another embodiment of a method 2900 for detecting object types and contact types from different modes, according to one embodiment. The maximum different values may be first calculated in step 2902, similar to step 2804 of method 2800. A mode may be determined in step 2905, between stylus mode, finger mode, or glove mode. If the device is in Stylus mode in step 2906, the peak unit cell and the 5×5 matrix of unit cells about the peak unit cell (as illustrated in FIGS. 10B and 10D) may be plotted on according to FIG. 27C. If the peak unit cell and the 5×5 matrix of unit cells falls within the glove partition of FIG. 27C in step 1915, method 2900 may determine if the mode change is within a debounce time in step 2917. If the mode change is within the debounce time, the mode switch may be set to "pending" in step 1918 and Stylus mode may be maintained in step 2924. Likewise, if the peak unit cell and the 5×5 matrix of unit cells does not fall within the glove partition of FIG. 27C in step 1915, Stylus mode may be maintained in step 2924. However, the peak unit cell and the 5×5 matrix of unit cells falls within the glove partition of FIG. 27C in step 1915, and the switch is outside a debounce time in step 2917, method 2900 may change the device mode to Glove mode in step 2922 and return that mode in step 2924.

If the device is in glove mode in step 2910, the peak unit cell and the 5×5 matrix of unit cells about the peak unit cell (as illustrated in FIGS. 10B and 10D) may be plotted on according to FIG. 27B. If the peak unit cell and the 5×5 matrix of unit cells falls within the stylus partition of FIG. 27B in step 2925, method 2900 may determine if the mode change is within a debounce time in step 2927. If the mode change is within the debounce time the mode switch may be set to "pending" in step 2928 and glove mode may be maintained in step 2924. Likewise, if the peak unit cell and the 5×5 matrix of unit cells does not fall within the stylus partition of FIG. 27C in step 2925, glove mode may be maintained in step 2942. However, the peak unit cell and the 5×5 matrix of unit cells falls within the glove partition of FIG. 27C in step 2925, and the switch is outside a debounce time in step 2957, method 2900 may change the device mode to stylus mode in step 2940 and return that mode in step 2942.

If the device is in finger mode in step 2908, method 2900 may first determine if there is a switch to glove mode pending in step 2945. If there is not, the peak unit cell and the 5×5 matrix of unit cells about the peak unit cell (as illustrated in FIGS. 10B and 10D) may be plotted on according to FIG. 27A. If the peak unit cell and the 5×5 matrix of unit cells falls within the stylus partition of FIG. 27B in step 2955, method 2900 may determine if the mode change is within a debounce time in step 2957. If the mode change is within the debounce time, the mode switch may be set to "pending" in step 2958 and finger mode many be maintained in step 2972. Likewise, if the peak unit cell and the 5×5 matrix of unit cells does not fall within the stylus partition of FIG. 27C in step 2955, finger mode may be maintained in step 2972. However, the peak unit cell and the 5×5 matrix of unit cells falls within the stylus partition of FIG. 27C in step 2955, and the switch is outside a debounce time in step 2957, method 2900 may change the device mode to stylus mode in step 2970 and return that mode in step 2972.

If there is a glove switch pending in step 2945, the peak unit cell and the 5×5 matrix of unit cells about the peak unit cell (as illustrated in FIGS. 10B and 10D) may be plotted on according to FIG. 27A. If the peak unit cell and the 5×5 matrix of unit cells falls within the glove partition of FIG. 27B in step 2975, method 2900 may determine if the mode change is within a debounce time in step 2977. If the mode change is within the debounce time, the mode switch may be set to "pending" in step 2958 and finger mode may be maintained in step 2992. Likewise, if the peak unit cell and the 5×5 matrix of unit cells does not fall within the glove partition of FIG. 27C in step 2975, Finger mode may be maintained in step 2992. However, the peak unit cell and the 5×5 matrix of unit cells falls within the glove partition of FIG. 27C in step 2975, and the switch is outside a debounce time in step 2977, method 2900 may change the device mode to glove mode in step 2990 and return that mode in step 2992.

Figure 30:
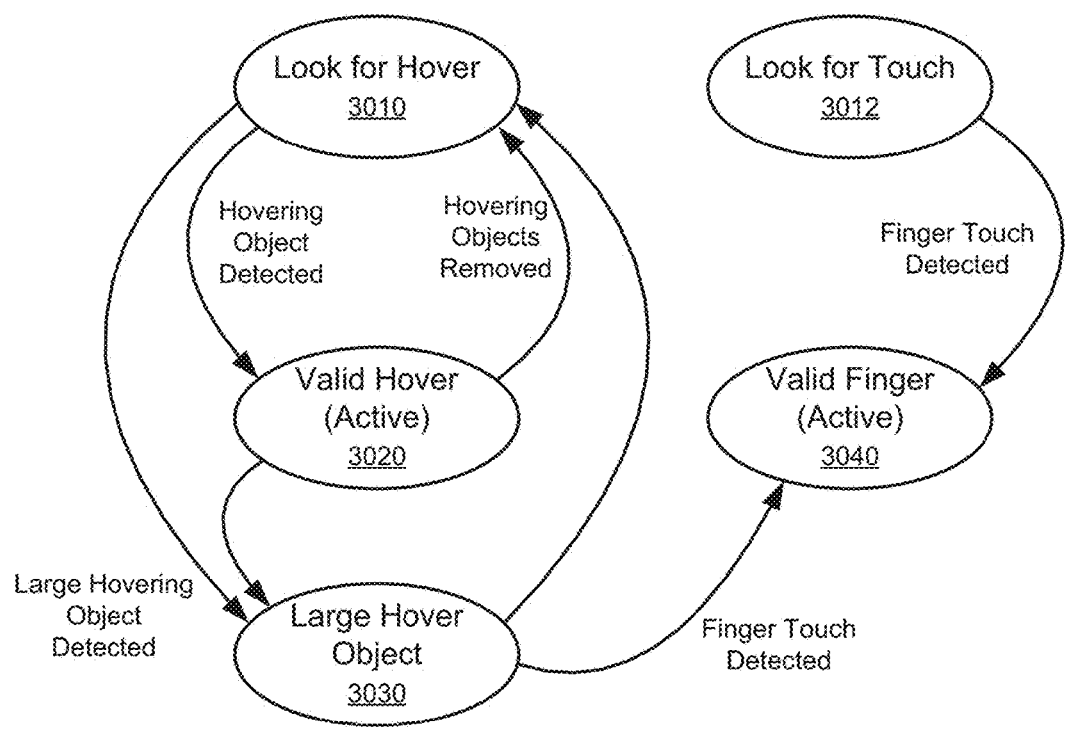
FIG. 30 illustrates a state diagram for moving between various states of a touchscreen device, according to one embodiment.

FIG. 30 illustrates one embodiment of a state diagram 3000 for entering into hover mode when if a large object is detected. State diagram 3000 may begin in look for hover mode 3010 or look for touch mode 3012. If a hovering object is detected, state diagram 3000 may enter a valid hover state 3020. If a large hovering object is detected, state diagram may enter a large hover object state 3030 from which only two options are possible: look for hover mode 3010 or valid finger mode 3040. This means that a valid hover state may not be entered if a large object is detected hovering over the array.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "integrating," "comparing," "balancing," "measuring," "performing," "accumulating," "controlling," "converting," "accumulating," "sampling," "storing," "coupling," "varying," "buffering," "applying," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
    at a touch-sensitive device operating in a first operational mode, wherein the first operational mode is associated with a two-dimensional chart partitioned into a plurality of regions, each region corresponding to a respective contact type:
        measuring capacitance on a plurality of mutual capacitance sensors, each mutual capacitance sensor corresponding to a unit cell in an array of unit cells;
        identifying a peak unit cell from the array of unit cells based on the measured capacitances;
        calculating a sum of measured capacitances for a plurality of unit cells surrounding the identified peak unit cell, wherein the plurality of unit cells is less than all of the array of unit cells;
        locating a point in the two-dimensional chart whose x-coordinate is the measured capacitance of the peak unit cell and whose y-coordinate is the calculated sum; and
        determining a contact type that corresponds to a region, in the chart, that contains the point.

2. The method of claim 1, wherein the contact type is selected from the group consisting of a bare finger, a gloved finger, a stylus, and a contact hovering above the array.

3. The method of claim 1, wherein the first operational mode is selected from the group consisting of a bare finger detection mode, a stylus detection mode, and a gloved finger detection mode.

4. The method of claim 1, wherein the plurality of unit cells surrounding the peak unit cell is a band of unit cells adjacent to the peak unit cell.

5. The method of claim 4, wherein a width of the band of unit cells adjacent to the peak unit cell is a single unit cell wide.

6. The method of claim 4, wherein a width of the band of unit cells adjacent to the peak unit cell is two unit cells wide.

7. The method of claim 4, wherein a width of the band of unit cells adjacent to the peak unit cell is predetermined.

8. The method of claim 1, wherein:
the array of unit cells includes a first number of unit cells;
the plurality of unit cells includes a second number of unit cells; and
the second number of unit cells is less than the first number of unit cells.

9. The method of claim 8, wherein the second number of unit cells is a predetermined number of unit cells.

10. The method of claim 1, wherein:
the chart is a first chart;
the first operational mode corresponds to a first contact type;
the plurality of partitioned regions is a first plurality of partitioned regions;
the method further comprises, in response to determining that the determined contact type differs from the first contact type, transitioning from the first operational mode to a second operational mode that corresponds to the determined contact type; and
the second operational mode is associated with a second chart partitioned into a second plurality of regions, each region corresponding to a respective contact type.

11. The method of claim 10, wherein a boundary of at least one region in the second plurality of regions differs from a boundary of a corresponding region in the first plurality of regions.

12. The method of claim 10, wherein:
a region, in the first chart, corresponding to the first contact type, has a first area;
a region, in the second chart, corresponding to the first contact type, has a second area; and
the second area is smaller than the first area.

13. The method of claim 1, further comprising in response to determining that the determined contact type corresponds to the first operational mode, reporting a position of a touch event based on the measured capacitances.

14. A touch-sensitive device comprising:
an array of unit cells;
a controller operating in a first operational mode, wherein the first operational mode is associated with a two-dimensional chart partitioned into a plurality of regions, each region corresponding to a respective contact type, the controller being configured to:
measure capacitance on a plurality of mutual capacitance sensors, each mutual capacitance sensor associated with a unit cell in the array of unit cells;
identify a peak unit cell from the array of unit cells based on the measured capacitances;
calculate a sum of measured capacitances for a plurality of unit cells surrounding the identified peak unit cell, wherein the plurality of unit cells is less than all of the array of unit cells;
locate a point in the two-dimensional chart whose x-coordinate is the measured capacitance of the peak unit cell and whose y-coordinate is the calculated sum; and
determine a contact type that corresponds to a region, in the chart, that contains the point.

15. The touch-sensitive device of claim 14, wherein the contact type is selected from the group consisting of a bare finger, a gloved finger, a stylus, and a contact hovering above the array.

16. The touch-sensitive device of claim 14, wherein the first operational mode is selected from the group consisting of a bare finger detection mode, a stylus detection mode, and a gloved finger detection mode.

17. A touchscreen controller configured to:
while operating in a first operational mode, wherein the first operational mode is associated with a two-dimensional chart partitioned into a plurality of regions, each region corresponding to a respective contact type:
measure capacitance on a plurality of mutual capacitance sensors, each mutual capacitance sensor associated with a unit cell in an array of unit cells;
identify a peak unit cell from the array of unit cells based on the measured capacitances;
calculate a sum of measured capacitances for a plurality of unit cells surrounding the identified peak unit cell, wherein the plurality of unit cells is less than all of the array of unit cells;
locate a point in the two-dimensional chart whose x-coordinate is the measured capacitance of the peak unit cell and whose y-coordinate is the calculated sum; and
determine a contact type that corresponds to a region, in the chart, that contains the point.

18. The touchscreen controller of claim 17, wherein the contact type is selected from the group consisting of a bare finger, a gloved finger, a stylus, and a contact hovering above the array.

19. The touchscreen controller of claim 17, wherein the first operational mode is selected from the group consisting of a bare finger detection mode, a stylus detection mode, and a gloved finger detection mode.

* * * * *